US009246659B2

(12) United States Patent
Gorokhov et al.

(10) Patent No.: US 9,246,659 B2
(45) Date of Patent: Jan. 26, 2016

(54) SEGMENT SENSITIVE SCHEDULING

(75) Inventors: Alexei Y. Gorokhov, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1014 days.

(21) Appl. No.: 12/388,414

(22) Filed: Feb. 18, 2009

(65) Prior Publication Data

US 2009/0201826 A1 Aug. 13, 2009

Related U.S. Application Data

(62) Division of application No. 11/260,924, filed on Oct. 27, 2005.

(60) Provisional application No. 60/710,461, filed on Aug. 22, 2005.

(51) Int. Cl.
*H04B 3/10* (2006.01)
*H04L 5/00* (2006.01)
*H04L 5/14* (2006.01)
(Continued)

(52) U.S. Cl.
CPC .............. *H04L 5/006* (2013.01); *H04L 5/0044* (2013.01); *H04L 5/1438* (2013.01); *H04L 1/0002* (2013.01); *H04L 1/0009* (2013.01); *H04L 1/0026* (2013.01); *H04L 1/1812* (2013.01); *H04L 5/0007* (2013.01); *H04L 5/0048* (2013.01); *H04L 5/0057* (2013.01); *H04L 5/0064* (2013.01); *H04L 25/0398* (2013.01)

(58) Field of Classification Search
USPC ................... 370/445, 448, 485, 491; 375/132
See application file for complete search history.

(56) References Cited

U.S. PATENT DOCUMENTS

| | | | |
|---|---|---|---|
| 4,393,276 | A | 7/1983 | Steele et al. |
| 4,554,668 | A | 11/1985 | Deman et al. |

(Continued)

FOREIGN PATENT DOCUMENTS

| | | |
|---|---|---|
| CA | 2348137 | 11/2001 |
| CA | 2477536 | 9/2003 |

(Continued)

OTHER PUBLICATIONS

Wang et al., "Improving performance of multi-user OFDM systems using bit-wise interleaver" Electronics Letters IEE Stevenage, GB, vol. 37. No. 19, Sep. 13, 2001, pp. 1173-1174 XP006017222.

(Continued)

*Primary Examiner* — Phuc Tran

(57) ABSTRACT

Systems and methods of scheduling sub-carriers in an OFDMA system in which a scheduler takes into account channel conditions experienced by the communication devices to optimize channel conditions. The scheduler can partition a set of sub-carriers spanning an operating bandwidth into a plurality of segments. The segments can include a plurality of global segments that each includes a distinct non-contiguous subset of the sub-carriers spanning substantially the entire operating bandwidth. One or more of the global segments can be further partitioned into a plurality of local segments that each has a bandwidth that is less than a channel coherence bandwidth. The scheduler determines channel characteristics experienced by each communication device via reporting or channel estimation, and allocates one or more segments to communication links for each device according to the channel characteristics.

28 Claims, 5 Drawing Sheets

(51) Int. Cl.

| | |
|---|---|
| *H04L 1/00* | (2006.01) |
| *H04L 1/18* | (2006.01) |
| *H04L 25/03* | (2006.01) |

(56) References Cited

U.S. PATENT DOCUMENTS 4,747,137 A 5/1988 Matsunaga
4,783,779 A 11/1988 Takahata et al.
4,783,780 A 11/1988 Alexis
4,975,952 A 12/1990 Mabey et al.
5,008,900 A 4/1991 Critchlow et al.
5,115,248 A 5/1992 Roederer et al.
5,268,694 A 12/1993 Jan et al.
5,282,222 A 1/1994 Fattouche et al.
5,363,408 A 11/1994 Paik et al.
5,371,761 A 12/1994 Daffara et al.
5,384,810 A 1/1995 Amrany
5,406,551 A 4/1995 Saito et al.
5,410,538 A 4/1995 Roche et al.
5,455,839 A 10/1995 Eyuboglu et al.
5,465,253 A 11/1995 Rahnema
5,491,727 A 2/1996 Petit et al.
5,513,379 A 4/1996 Benveniste et al.
5,539,748 A 7/1996 Raith
5,548,582 A 8/1996 Brajal et al.
5,553,069 A 9/1996 Ueno et al.
5,583,869 A 12/1996 Grube et al.
5,594,738 A 1/1997 Crisler et al.
5,604,744 A 2/1997 Anderson et al.
5,612,978 A 3/1997 Blanchard et al.
5,625,876 A 4/1997 Gilhousen et al.
5,684,491 A 11/1997 Newman et al.
5,726,978 A 3/1998 Frodigh et al.
5,732,113 A 3/1998 Schmidl et al.
5,745,487 A 4/1998 Hamaki
5,768,276 A 6/1998 Diachina et al.
5,790,537 A 8/1998 Yoon et al.
5,812,938 A 9/1998 Gilhousen et al.
5,815,488 A 9/1998 Williams et al.
5,822,368 A 10/1998 Wang et al.
5,828,650 A 10/1998 Malkamaki et al.
5,838,268 A 11/1998 Frenkel et al.
5,867,478 A 2/1999 Baum et al.
5,870,393 A 2/1999 Yano et al.
5,887,023 A 3/1999 Mabuchi et al.
5,907,585 A 5/1999 Suzuki et al.
5,920,571 A 7/1999 Houck et al.
5,926,470 A 7/1999 Tiedemann, Jr.
5,933,421 A 8/1999 Alamouti et al.
5,949,814 A 9/1999 Odenwalder et al.
5,953,325 A 9/1999 Willars et al.
5,955,992 A 9/1999 Shattil et al.
5,956,642 A 9/1999 Larsson et al.
5,995,992 A 11/1999 Eckard et al.
5,999,826 A 12/1999 Whinnett
6,002,942 A 12/1999 Park et al.
6,016,123 A 1/2000 Barton et al.
6,038,150 A 3/2000 Yee et al.
6,038,263 A 3/2000 Kotzin et al.
6,038,450 A 3/2000 Brink et al.
6,052,364 A 4/2000 Chalmers et al.
6,061,337 A 5/2000 Light et al.
6,067,315 A 5/2000 Sandin
6,075,350 A 6/2000 Peng et al.
6,075,797 A 6/2000 Thomas
6,076,114 A 6/2000 Wesley
6,088,345 A 7/2000 Sakoda et al.
6,088,592 A 7/2000 Doner et al.
6,108,323 A 8/2000 Gray et al.
6,108,550 A 8/2000 Wiorek et al.
6,112,094 A 8/2000 Dent et al.
6,128,776 A 10/2000 Kang et al.
6,138,037 A 10/2000 Jaamies
6,141,317 A 10/2000 Marchok et al.
6,154,484 A 11/2000 Lee et al.
6,169,910 B1 1/2001 Tamil et al.
6,172,993 B1 1/2001 Kim et al.
6,175,550 B1 1/2001 Van Nee et al.
6,175,650 B1 1/2001 Sindhu et al.
6,176,550 B1 1/2001 Lamart et al.
6,198,775 B1 3/2001 Khayrallah et al.
6,215,983 B1 4/2001 Dogan et al.
6,226,280 B1 5/2001 Roark et al.
6,232,918 B1 5/2001 Wax et al.
6,240,129 B1 5/2001 Reusens et al.
6,249,683 B1 6/2001 Lundby et al.
6,256,478 B1 7/2001 Allen et al.
6,271,946 B1 8/2001 Chang et al.
6,272,122 B1 8/2001 Wee et al.
6,310,704 B1 10/2001 Dogan et al.
6,317,435 B1 11/2001 Tiedemann, Jr. et al.
6,335,922 B1 1/2002 Tiedemann, Jr. et al.
6,337,659 B1 1/2002 Kim et al.
6,337,983 B1 1/2002 Bonta et al.
6,353,637 B1 3/2002 Mansour et al.
6,363,060 B1 3/2002 Sarkar
6,374,115 B1 4/2002 Barnes et al.
6,377,539 B1 4/2002 Kang et al.
6,377,809 B1 4/2002 Rezaiifar et al.
6,388,998 B1 5/2002 Kasturia et al.
6,393,008 B1 5/2002 Cheng et al.
6,393,012 B1 5/2002 Pankaj
6,401,062 B1 6/2002 Murashima
6,438,369 B1 8/2002 Huang et al.
6,449,246 B1 9/2002 Barton et al.
6,466,800 B1 10/2002 Sydon et al.
6,473,467 B1 10/2002 Wallace et al.
6,477,317 B1 11/2002 Itokawa
6,478,422 B1 11/2002 Hansen
6,483,820 B1 11/2002 Davidson et al.
6,487,243 B1 11/2002 Hwang et al.
6,496,790 B1 12/2002 Kathavate et al.
6,501,810 B1 12/2002 Karim et al.
6,507,601 B2 1/2003 Parsa et al.
6,519,462 B1 2/2003 Lu et al.
6,529,525 B1 3/2003 Pecen et al.
6,535,666 B1 3/2003 Dogan et al.
6,539,008 B1 3/2003 Ahn et al.
6,539,213 B1 3/2003 Richards et al.
6,542,485 B1 4/2003 Mujtaba
6,542,743 B1 4/2003 Soliman
6,563,806 B1 5/2003 Yano et al.
6,563,881 B1 5/2003 Sakoda et al.
6,577,739 B1 6/2003 Hurtig et al.
6,584,140 B1 6/2003 Lee et al.
6,590,881 B1 7/2003 Wallace et al.
6,597,746 B1 7/2003 Amrany et al.
6,601,206 B1 7/2003 Marvasti
6,614,857 B1 9/2003 Buehrer et al.
6,625,172 B2 9/2003 Odenwalder et al.
6,636,568 B2 10/2003 Kadous et al.
6,654,339 B1 11/2003 Bohnke et al.
6,654,431 B1 11/2003 Barton et al.
6,657,949 B1 12/2003 Jones, IV et al.
6,658,258 B1 12/2003 Chen et al.
6,674,787 B1 1/2004 Dick et al.
6,674,810 B1 1/2004 Cheng et al.
6,675,012 B2 1/2004 Gray et al.
6,678,318 B1 1/2004 Lai et al.
6,690,951 B1 2/2004 Cuffaro et al.
6,693,952 B1 2/2004 Chuah et al.
6,701,165 B1 3/2004 Ho et al.
6,704,571 B1 3/2004 Moon
6,711,400 B1 3/2004 Aura
6,717,908 B2 4/2004 Vijayan et al.
6,721,568 B1 4/2004 Gustavsson et al.
6,724,719 B1 * 4/2004 Tong et al. .................... 370/209
6,731,602 B1 5/2004 Watanabe et al.
6,735,244 B1 5/2004 Hasegawa et al.
6,744,743 B2 6/2004 Walton et al.
6,748,220 B1 6/2004 Chow et al.
6,751,444 B1 6/2004 Meiyappan et al.
6,751,456 B2 6/2004 Bilgic
6,754,511 B1 6/2004 Halford et al.

(56) References Cited

U.S. PATENT DOCUMENTS

| | | | |
|---|---|---|---|
| 6,763,009 B1 | 7/2004 | Bedekar et al. | |
| 6,765,969 B1 | 7/2004 | Vook et al. | |
| 6,776,165 B2 | 8/2004 | Jin | |
| 6,776,765 B2 | 8/2004 | Soukup et al. | |
| 6,778,513 B2 | 8/2004 | Kasapi et al. | |
| 6,785,341 B2 | 8/2004 | Walton et al. | |
| 6,798,736 B1 | 9/2004 | Black et al. | |
| 6,799,043 B2 | 9/2004 | Tiedemann, Jr. et al. | |
| 6,802,035 B2 | 10/2004 | Catreux et al. | |
| 6,804,307 B1 | 10/2004 | Popovic | |
| 6,813,284 B2 | 11/2004 | Vayanos et al. | |
| 6,821,535 B2 | 11/2004 | Nurmi et al. | |
| 6,828,293 B1 | 12/2004 | Hazenkamp et al. | |
| 6,829,293 B2 | 12/2004 | Jones et al. | |
| 6,831,943 B1 | 12/2004 | Dabak et al. | |
| 6,842,487 B1 | 1/2005 | Larsson | |
| 6,850,481 B2 | 2/2005 | Wu et al. | |
| 6,850,509 B2 | 2/2005 | Lee et al. | |
| 6,862,271 B2 | 3/2005 | Medvedev et al. | |
| 6,870,808 B1 | 3/2005 | Liu et al. | |
| 6,870,826 B1 | 3/2005 | Ishizu et al. | |
| 6,904,097 B2 | 6/2005 | Agami et al. | |
| 6,904,283 B2 | 6/2005 | Li et al. | |
| 6,904,550 B2 | 6/2005 | Sibecas et al. | |
| 6,907,020 B2 * | 6/2005 | Periyalwar et al. | 370/337 |
| 6,907,269 B2 | 6/2005 | Yamaguchi et al. | |
| 6,909,707 B2 | 6/2005 | Rotstein et al. | |
| 6,909,797 B2 | 6/2005 | Romsdahl et al. | |
| 6,917,602 B2 | 7/2005 | Toskala et al. | |
| 6,917,821 B2 | 7/2005 | Kadous et al. | |
| 6,927,728 B2 | 8/2005 | Vook et al. | |
| 6,928,047 B1 | 8/2005 | Xia et al. | |
| 6,934,266 B2 | 8/2005 | Dulin et al. | |
| 6,934,275 B1 | 8/2005 | Love et al. | |
| 6,934,340 B1 | 8/2005 | Dollard | |
| 6,940,827 B2 * | 9/2005 | Li et al. | 370/278 |
| 6,940,842 B2 | 9/2005 | Proctor, Jr. | |
| 6,940,845 B2 * | 9/2005 | Benveniste | 370/349 |
| 6,954,448 B2 | 10/2005 | Farley et al. | |
| 6,954,481 B1 | 10/2005 | Laroia et al. | |
| 6,954,622 B2 | 10/2005 | Nelson et al. | |
| 6,961,364 B1 | 11/2005 | Laroia et al. | |
| 6,963,543 B2 | 11/2005 | Diep et al. | |
| 6,970,682 B2 | 11/2005 | Crilly, Jr. et al. | |
| 6,975,868 B2 | 12/2005 | Joshi et al. | |
| 6,980,540 B1 | 12/2005 | Laroia et al. | |
| 6,985,434 B2 | 1/2006 | Wu et al. | |
| 6,985,453 B2 | 1/2006 | Lundby et al. | |
| 6,985,466 B1 | 1/2006 | Yun et al. | |
| 6,985,498 B2 | 1/2006 | Laroia et al. | |
| 6,987,746 B1 | 1/2006 | Song | |
| 6,993,342 B2 | 1/2006 | Kuchibhotla et al. | |
| 7,002,900 B2 | 2/2006 | Walton et al. | |
| 7,006,529 B2 | 2/2006 | Alastalo et al. | |
| 7,006,557 B2 | 2/2006 | Subrahmanya et al. | |
| 7,006,848 B2 | 2/2006 | Ling et al. | |
| 7,009,500 B2 | 3/2006 | Rao et al. | |
| 7,010,048 B1 | 3/2006 | Shattil et al. | |
| 7,013,143 B2 | 3/2006 | Love et al. | |
| 7,016,318 B2 | 3/2006 | Pankaj et al. | |
| 7,016,319 B2 | 3/2006 | Baum et al. | |
| 7,016,425 B1 | 3/2006 | Kraiem et al. | |
| 7,020,110 B2 | 3/2006 | Walton et al. | |
| 7,039,356 B2 | 5/2006 | Nguyen | |
| 7,039,370 B2 | 5/2006 | Laroia et al. | |
| 7,042,856 B2 | 5/2006 | Walton et al. | |
| 7,042,857 B2 | 5/2006 | Krishnan et al. | |
| 7,047,006 B2 | 5/2006 | Classon et al. | |
| 7,050,402 B2 | 5/2006 | Schmidl et al. | |
| 7,050,405 B2 | 5/2006 | Attar et al. | |
| 7,050,759 B2 | 5/2006 | Gaal et al. | |
| 7,054,301 B1 | 5/2006 | Sousa et al. | |
| 7,069,009 B2 | 6/2006 | Li et al. | |
| 7,072,315 B1 | 7/2006 | Liu et al. | |
| 7,079,867 B2 | 7/2006 | Chun | |
| 7,085,574 B2 | 8/2006 | Gaal et al. | |
| 7,095,708 B1 | 8/2006 | Alamouti et al. | |
| 7,095,709 B2 | 8/2006 | Walton et al. | |
| 7,099,299 B2 | 8/2006 | Liang et al. | |
| 7,099,630 B2 | 8/2006 | Brunner et al. | |
| 7,103,384 B2 | 9/2006 | Chun | |
| 7,106,319 B2 | 9/2006 | Ishiyama | |
| 7,113,808 B2 | 9/2006 | Hwang et al. | |
| 7,120,134 B2 | 10/2006 | Tiedemann, Jr. et al. | |
| 7,120,395 B2 | 10/2006 | Tong et al. | |
| 7,126,928 B2 | 10/2006 | Tiedemann, Jr. et al. | |
| 7,131,086 B2 | 10/2006 | Yamasaki et al. | |
| 7,133,460 B2 | 11/2006 | Bae et al. | |
| 7,139,328 B2 | 11/2006 | Thomas et al. | |
| 7,142,864 B2 | 11/2006 | Laroia et al. | |
| 7,145,940 B2 | 12/2006 | Gore et al. | |
| 7,145,959 B2 | 12/2006 | Harel et al. | |
| 7,149,199 B2 | 12/2006 | Sung et al. | |
| 7,149,238 B2 | 12/2006 | Agee et al. | |
| 7,151,761 B1 | 12/2006 | Palenius | |
| 7,151,936 B2 | 12/2006 | Wager et al. | |
| 7,154,936 B2 | 12/2006 | Bjerke et al. | |
| 7,155,236 B2 | 12/2006 | Chen et al. | |
| 7,157,351 B2 | 1/2007 | Cheng et al. | |
| 7,161,649 B2 | 1/2007 | Lee et al. | |
| 7,161,971 B2 | 1/2007 | Tiedemann, Jr. et al. | |
| 7,164,696 B2 | 1/2007 | Sano et al. | |
| 7,167,916 B2 | 1/2007 | Willen et al. | |
| 7,170,937 B2 | 1/2007 | Zhou | |
| 7,177,297 B2 | 2/2007 | Agrawal et al. | |
| 7,177,351 B2 | 2/2007 | Kadous | |
| 7,180,627 B2 | 2/2007 | Moylan et al. | |
| 7,181,170 B2 | 2/2007 | Love et al. | |
| 7,184,426 B2 | 2/2007 | Padovani et al. | |
| 7,184,713 B2 | 2/2007 | Kadous et al. | |
| 7,188,300 B2 | 3/2007 | Eriksson et al. | |
| 7,197,282 B2 | 3/2007 | Dent et al. | |
| 7,200,177 B2 | 4/2007 | Miyoshi et al. | |
| 7,209,712 B2 | 4/2007 | Holtzman | |
| 7,215,979 B2 | 5/2007 | Nakagawa et al. | |
| 7,230,942 B2 | 6/2007 | Laroia et al. | |
| 7,233,634 B1 | 6/2007 | Hassell Sweatman et al. | |
| 7,236,747 B1 | 6/2007 | Meacham et al. | |
| 7,242,722 B2 | 7/2007 | Krauss et al. | |
| 7,243,150 B2 | 7/2007 | Sher et al. | |
| 7,248,559 B2 | 7/2007 | Ma et al. | |
| 7,248,841 B2 | 7/2007 | Agee et al. | |
| 7,254,158 B2 | 8/2007 | Agrawal | |
| 7,257,167 B2 | 8/2007 | Lau | |
| 7,257,406 B2 | 8/2007 | Ji et al. | |
| 7,257,423 B2 | 8/2007 | Iochi et al. | |
| 7,260,153 B2 | 8/2007 | Nissani et al. | |
| 7,280,467 B2 | 10/2007 | Smee et al. | |
| 7,289,570 B2 | 10/2007 | Schmidl et al. | |
| 7,289,585 B2 | 10/2007 | Sandhu et al. | |
| 7,290,195 B2 | 10/2007 | Guo et al. | |
| 7,292,651 B2 | 11/2007 | Li | |
| 7,292,863 B2 | 11/2007 | Chen et al. | |
| 7,295,509 B2 | 11/2007 | Laroia et al. | |
| 7,313,086 B2 | 12/2007 | Aizawa et al. | |
| 7,313,126 B2 | 12/2007 | Yun et al. | |
| 7,313,174 B2 | 12/2007 | Alard et al. | |
| 7,313,407 B2 | 12/2007 | Shapira et al. | |
| 7,327,812 B2 | 2/2008 | Auer et al. | |
| 7,330,701 B2 | 2/2008 | Mukkavilli et al. | |
| 7,336,727 B2 | 2/2008 | Mukkavilli et al. | |
| 7,349,371 B2 | 3/2008 | Schein et al. | |
| 7,349,667 B2 | 3/2008 | Magee et al. | |
| 7,356,000 B2 | 4/2008 | Oprescu-Surcobe et al. | |
| 7,356,005 B2 | 4/2008 | Derryberry et al. | |
| 7,356,073 B2 | 4/2008 | Heikkila | |
| 7,359,327 B2 | 4/2008 | Oshiba | |
| 7,363,055 B2 | 4/2008 | Castrogiovanni et al. | |
| 7,366,223 B1 | 4/2008 | Chen et al. | |
| 7,366,253 B2 | 4/2008 | Kim et al. | |
| 7,366,520 B2 | 4/2008 | Haustein et al. | |
| 7,369,531 B2 | 5/2008 | Cho et al. | |
| 7,372,911 B1 | 5/2008 | Lindskog et al. | |
| 7,372,912 B2 | 5/2008 | Seo et al. | |

(56) References Cited

U.S. PATENT DOCUMENTS 7,379,489 B2 5/2008 Zuniga et al.
7,382,764 B2 6/2008 Uehara
7,392,014 B2 6/2008 Baker et al.
7,394,865 B2 7/2008 Borran et al.
7,403,745 B2 7/2008 Dominique et al.
7,403,748 B1 7/2008 Keskitalo et al.
7,406,119 B2 7/2008 Yamano et al.
7,406,336 B2 7/2008 Astely et al.
7,411,898 B2 8/2008 Erlich et al.
7,412,212 B2 8/2008 Hottinen et al.
7,418,043 B2 8/2008 Shattil et al.
7,418,246 B2 8/2008 Kim et al.
7,423,991 B2 9/2008 Cho et al.
7,426,426 B2 9/2008 Van Baren et al.
7,428,426 B2 9/2008 Kiran et al.
7,433,661 B2 10/2008 Kogiantis et al.
7,437,164 B2 10/2008 Agrawal et al.
7,443,835 B2 10/2008 Lakshmi Narayanan et al.
7,447,270 B1 11/2008 Hottinen et al.
7,450,532 B2 11/2008 Chae et al.
7,450,548 B2 11/2008 Haustein et al.
7,460,466 B2 12/2008 Lee et al.
7,463,698 B2 12/2008 Fujii et al.
7,468,943 B2 12/2008 Gu et al.
7,469,011 B2 12/2008 Lin et al.
7,471,963 B2 12/2008 Kim et al.
7,483,408 B2 1/2009 Bevan et al.
7,483,719 B2 1/2009 Kim et al.
7,486,408 B2 2/2009 Van Der Schaar et al.
7,486,735 B2 2/2009 Dubuc et al.
7,492,788 B2 2/2009 Zhang et al.
7,499,393 B2 3/2009 Ozluturk et al.
7,508,748 B2 3/2009 Kadous
7,508,842 B2 3/2009 Baum et al.
7,512,096 B2 3/2009 Kuzminskiy et al.
7,545,867 B1 6/2009 Lou et al.
7,548,506 B2 6/2009 Ma et al.
7,551,546 B2 6/2009 Ma et al.
7,551,564 B2 6/2009 Mattina
7,558,293 B2 7/2009 Choi et al.
7,567,621 B2 7/2009 Sampath et al.
7,573,900 B2 8/2009 Kim et al.
7,599,327 B2 10/2009 Zhuang
7,616,955 B2 11/2009 Kim et al.
7,627,051 B2 12/2009 Shen et al.
7,664,061 B2 2/2010 Hottinen
7,676,007 B1 3/2010 Choi et al.
7,684,507 B2 3/2010 Levy
7,724,777 B2 5/2010 Sutivong et al.
7,768,979 B2 8/2010 Sutivong et al.
7,899,497 B2 3/2011 Kish et al.
7,916,624 B2 3/2011 Laroia et al.
7,924,699 B2 4/2011 Laroia et al.
7,990,843 B2 8/2011 Laroia et al.
7,990,844 B2 8/2011 Laroia et al.
8,014,271 B2 9/2011 Laroia et al.
8,045,512 B2 10/2011 Khandekar et al.
8,095,141 B2 1/2012 Teague
8,098,568 B2 1/2012 Laroia et al.
8,098,569 B2 1/2012 Laroia et al.
8,199,634 B2 6/2012 Laroia et al.
8,218,425 B2 7/2012 Laroia et al.
8,223,627 B2 7/2012 Laroia et al.
8,462,859 B2 6/2013 Sampath et al.
8,477,684 B2 7/2013 Khandekar et al.
2001/0021180 A1 9/2001 Lee et al.
2001/0021650 A1 9/2001 Bilgic et al.
2001/0024427 A1 9/2001 Suzuki
2001/0030948 A1* 10/2001 Tiedemann, Jr. ............. 370/305
2001/0047424 A1 11/2001 Alastalo et al.
2001/0053140 A1 12/2001 Choi et al.
2001/0055294 A1 12/2001 Motoyoshi
2001/0055297 A1 12/2001 Benveniste et al.
2002/0000948 A1 1/2002 Chun et al.
2002/0015405 A1 2/2002 Sepponen et al.
2002/0018157 A1 2/2002 Zhang et al.
2002/0039912 A1 4/2002 Yamaguchi et al.
2002/0044524 A1 4/2002 Laroia et al.
2002/0058525 A1 5/2002 Kasapi et al.
2002/0061742 A1 5/2002 Lapaille et al.
2002/0077152 A1 6/2002 Johnson et al.
2002/0085521 A1 7/2002 Tripathi et al.
2002/0090004 A1 7/2002 Rinchiuso
2002/0090024 A1 7/2002 Tan
2002/0101839 A1 8/2002 Farley et al.
2002/0122381 A1 9/2002 Wu et al.
2002/0122400 A1 9/2002 Vayanos et al.
2002/0122403 A1 9/2002 Hashem et al.
2002/0128035 A1 9/2002 Jokinen et al.
2002/0147953 A1 10/2002 Catreux et al.
2002/0159422 A1 10/2002 Li et al.
2002/0160769 A1 10/2002 Gray et al.
2002/0160781 A1 10/2002 Bark et al.
2002/0168946 A1 11/2002 Aizawa et al.
2002/0172293 A1 11/2002 Kuchi et al.
2002/0176398 A1 11/2002 Nidda
2002/0181571 A1 12/2002 Yamano et al.
2002/0193146 A1 12/2002 Wallace et al.
2003/0002464 A1 1/2003 Rezaiifar et al.
2003/0020651 A1 1/2003 Crilly, Jr. et al.
2003/0027579 A1 2/2003 Sydon
2003/0035491 A1 2/2003 Walton et al.
2003/0036359 A1 2/2003 Dent et al.
2003/0040283 A1 2/2003 Kawai et al.
2003/0043732 A1 3/2003 Walton et al.
2003/0043764 A1 3/2003 Kim et al.
2003/0063579 A1 4/2003 Lee
2003/0068983 A1 4/2003 Kim et al.
2003/0072254 A1 4/2003 Ma et al.
2003/0072255 A1 4/2003 Ma et al.
2003/0072280 A1 4/2003 McFarland et al.
2003/0072395 A1 4/2003 Jia et al.
2003/0073409 A1 4/2003 Nobukiyo et al.
2003/0073464 A1 4/2003 Giannakis et al.
2003/0076890 A1 4/2003 Hochwald et al.
2003/0086371 A1 5/2003 Walton et al.
2003/0086393 A1 5/2003 Vasudevan et al.
2003/0096579 A1 5/2003 Ito et al.
2003/0103520 A1 6/2003 Chen et al.
2003/0109266 A1 6/2003 Rafiah et al.
2003/0112745 A1 6/2003 Zhuang et al.
2003/0123414 A1 7/2003 Tong et al.
2003/0125040 A1 7/2003 Walton et al.
2003/0128658 A1 7/2003 Walton et al.
2003/0133426 A1 7/2003 Schein et al.
2003/0142648 A1 7/2003 Semper
2003/0142729 A1 7/2003 Subrahmanya et al.
2003/0147371 A1 8/2003 Choi et al.
2003/0161281 A1 8/2003 Dulin et al.
2003/0161282 A1 8/2003 Medvedev et al.
2003/0165189 A1 9/2003 Kadous et al.
2003/0181170 A1 9/2003 Sim
2003/0185310 A1 10/2003 Ketchum et al.
2003/0190897 A1 10/2003 Lei et al.
2003/0193915 A1 10/2003 Lee et al.
2003/0202491 A1 10/2003 Tiedemann, Jr. et al.
2003/0202560 A1 10/2003 Tiedemann, Jr. et al.
2003/0216156 A1 11/2003 Chun et al.
2003/0228850 A1 12/2003 Hwang
2003/0235255 A1 12/2003 Ketchum et al.
2004/0001429 A1 1/2004 Ma et al.
2004/0001460 A1 1/2004 Bevan et al.
2004/0002364 A1 1/2004 Trikkonen et al.
2004/0009783 A1 1/2004 Miyoshi et al.
2004/0010623 A1 1/2004 Sher et al.
2004/0015692 A1 1/2004 Green et al.
2004/0017785 A1 1/2004 Zelst et al.
2004/0032443 A1 2/2004 Moylan et al.
2004/0042558 A1 3/2004 Hwang et al.
2004/0048609 A1 3/2004 Kosaka
2004/0048630 A1 3/2004 Shapira et al.
2004/0054999 A1 3/2004 Willen et al.
2004/0057394 A1 3/2004 Holtzman et al.
2004/0058687 A1 3/2004 Kim et al.

(56) References Cited

U.S. PATENT DOCUMENTS

2004/0066754 A1 4/2004 Hottinen et al.
2004/0066761 A1 4/2004 Giannakis et al.
2004/0066772 A1 4/2004 Moon et al.
2004/0067756 A1 4/2004 Wager et al.
2004/0072565 A1 4/2004 Nobukiyo et al.
2004/0076185 A1 4/2004 Kim et al.
2004/0077345 A1 4/2004 Turner et al.
2004/0077379 A1 4/2004 Smith et al.
2004/0081073 A1 4/2004 Walton et al.
2004/0081195 A1 4/2004 El-Maleh et al.
2004/0087325 A1 5/2004 Cheng et al.
2004/0095907 A1 5/2004 Agee et al.
2004/0097215 A1 5/2004 Abe et al.
2004/0097240 A1 5/2004 Chen et al.
2004/0098505 A1 5/2004 Clemmensen et al.
2004/0105489 A1 6/2004 Kim et al.
2004/0114618 A1 6/2004 Tong et al.
2004/0120411 A1 6/2004 Walton et al.
2004/0125792 A1 7/2004 Bradbury et al.
2004/0128605 A1 7/2004 Sibecas et al.
2004/0131007 A1 7/2004 Smee et al.
2004/0131008 A1 7/2004 Zuniga et al.
2004/0131038 A1 7/2004 Kim et al.
2004/0131110 A1 7/2004 Alard et al.
2004/0136344 A1 7/2004 Kim et al.
2004/0136349 A1 7/2004 Walton et al.
2004/0156328 A1 8/2004 Walton et al.
2004/0160914 A1 8/2004 Sarkar et al.
2004/0160933 A1 8/2004 Odenwalder et al.
2004/0162083 A1 8/2004 Chen et al.
2004/0165564 A1 8/2004 Kim et al.
2004/0166867 A1 8/2004 Hawe et al.
2004/0166887 A1 8/2004 Laroia et al.
2004/0170152 A1 9/2004 Nagao et al.
2004/0170157 A1 9/2004 Kim et al.
2004/0171384 A1 9/2004 Holma et al.
2004/0171385 A1 9/2004 Haustein et al.
2004/0178954 A1 * 9/2004 Vook et al. .................... 342/383
2004/0179480 A1 9/2004 Attar et al.
2004/0179494 A1 9/2004 Attar et al.
2004/0179506 A1 9/2004 Padovani et al.
2004/0179627 A1 9/2004 Ketchum et al.
2004/0181569 A1 9/2004 Attar et al.
2004/0185792 A1 9/2004 Alexiou et al.
2004/0190640 A1 9/2004 Dubuc et al.
2004/0202257 A1 10/2004 Mehta et al.
2004/0208138 A1 10/2004 Hayashi et al.
2004/0218520 A1 11/2004 Aizawa et al.
2004/0219919 A1 11/2004 Whinnett et al.
2004/0224711 A1 11/2004 Panchal et al.
2004/0228267 A1 11/2004 Agrawal et al.
2004/0228313 A1 11/2004 Cheng et al.
2004/0229615 A1 11/2004 Agrawal et al.
2004/0240419 A1 12/2004 Abrishamkar et al.
2004/0240572 A1 12/2004 Brutel et al.
2004/0248604 A1 12/2004 Vaidyanathan et al.
2004/0252529 A1 12/2004 Huber et al.
2004/0252629 A1 12/2004 Hasegawa et al.
2004/0252655 A1 12/2004 Lim et al.
2004/0252662 A1 12/2004 Cho
2004/0257979 A1 12/2004 Ro et al.
2004/0264507 A1 12/2004 Cho et al.
2004/0264585 A1 12/2004 Borran et al.
2004/0264593 A1 12/2004 Shim et al.
2005/0002412 A1 1/2005 Sagfors et al.
2005/0002440 A1 1/2005 Alamouti et al.
2005/0002467 A1 1/2005 Seo et al.
2005/0002468 A1 1/2005 Walton et al.
2005/0003782 A1 1/2005 Wintzell
2005/0008091 A1 1/2005 Boutros et al.
2005/0009486 A1 1/2005 Al-Dhahir et al.
2005/0013263 A1 1/2005 Kim et al.
2005/0025093 A1 2/2005 Yun et al.
2005/0030886 A1 2/2005 Wu et al.
2005/0030964 A1 2/2005 Tiedemann, Jr. et al.
2005/0034079 A1 2/2005 Gunasekar et al.
2005/0041611 A1 2/2005 Sandhu et al.
2005/0041618 A1 2/2005 Wei et al.
2005/0041750 A1 2/2005 Lau et al.
2005/0041775 A1 2/2005 Batzinger et al.
2005/0044206 A1 2/2005 Johansson et al.
2005/0047517 A1 3/2005 Georgios et al.
2005/0052991 A1 3/2005 Kadous
2005/0053081 A1 3/2005 Andersson et al.
2005/0053151 A1 3/2005 Lin et al.
2005/0063298 A1 3/2005 Ling et al.
2005/0068921 A1 3/2005 Liu
2005/0073976 A1 4/2005 Fujii
2005/0084000 A1 4/2005 Krauss et al.
2005/0085195 A1 4/2005 Tong et al.
2005/0085236 A1 4/2005 Gerlach et al.
2005/0111397 A1 5/2005 Attar et al.
2005/0113100 A1 5/2005 Oprescu-Surcobe et al.
2005/0122898 A1 6/2005 Jang et al.
2005/0128683 A1 6/2005 Watanabe et al.
2005/0128983 A1 6/2005 Kim et al.
2005/0135324 A1 6/2005 Kim et al.
2005/0135498 A1 6/2005 Yee
2005/0141624 A1 6/2005 Lakshmipathi et al.
2005/0147024 A1 7/2005 Jung et al.
2005/0147025 A1 7/2005 Auer et al.
2005/0152484 A1 7/2005 Sandhu et al.
2005/0157807 A1 7/2005 Shim et al.
2005/0159162 A1 7/2005 Park
2005/0164709 A1 7/2005 Balasubramanian et al.
2005/0165949 A1 7/2005 Teague
2005/0174981 A1 8/2005 Heath, Jr. et al.
2005/0175070 A1 8/2005 Grob et al.
2005/0180311 A1 8/2005 Wang et al.
2005/0180313 A1 8/2005 Kim et al.
2005/0181799 A1 8/2005 Laroia et al.
2005/0192011 A1 9/2005 Hong et al.
2005/0195733 A1 9/2005 Walton et al.
2005/0195852 A1 9/2005 Vayanos et al.
2005/0195886 A1 9/2005 Lampinen et al.
2005/0201296 A1 9/2005 Vannithamby et al.
2005/0204247 A1 9/2005 Guo et al.
2005/0207367 A1 9/2005 Onggosanusi et al.
2005/0215196 A1 9/2005 Krishnan et al.
2005/0215251 A1 9/2005 Krishnan et al.
2005/0226204 A1 10/2005 Uehara et al.
2005/0239465 A1 10/2005 Lee et al.
2005/0243791 A1 11/2005 Park et al.
2005/0246548 A1 11/2005 Laitinen
2005/0249266 A1 11/2005 Brown et al.
2005/0254416 A1 11/2005 Laroia et al.
2005/0254467 A1 11/2005 Li et al.
2005/0254477 A1 11/2005 Lee et al.
2005/0254556 A1 11/2005 Fujii et al.
2005/0259005 A1 11/2005 Chiang et al.
2005/0259723 A1 11/2005 Blanchard et al.
2005/0259757 A1 11/2005 Wu et al.
2005/0265220 A1 12/2005 Erlich et al.
2005/0265293 A1 12/2005 Ro et al.
2005/0265470 A1 12/2005 Kishigami et al.
2005/0271012 A1 12/2005 Agrawal et al.
2005/0276347 A1 12/2005 Mujtaba et al.
2005/0276348 A1 12/2005 Vandenameele
2005/0277423 A1 12/2005 Sandhu et al.
2005/0281029 A1 12/2005 Inamoto et al.
2005/0281290 A1 12/2005 Khandekar et al.
2005/0282500 A1 12/2005 Wang et al.
2005/0286408 A1 12/2005 Jin et al.
2005/0289256 A1 12/2005 Cudak et al.
2006/0002451 A1 1/2006 Fukuta et al.
2006/0013285 A1 1/2006 Kobayashi et al.
2006/0018336 A1 1/2006 Sutivong et al.
2006/0018347 A1 1/2006 Agrawal
2006/0018397 A1 1/2006 Sampath et al.
2006/0026344 A1 2/2006 Sun Hsu et al.
2006/0029289 A1 2/2006 Yamaguchi et al.
2006/0034164 A1 2/2006 Ozluturk et al.
2006/0034173 A1 2/2006 Teague et al.
2006/0039332 A1 2/2006 Kotzin

(56) References Cited

U.S. PATENT DOCUMENTS

| | | | |
|---|---|---|---|
| 2006/0039344 | A1 | 2/2006 | Khan |
| 2006/0039500 | A1 | 2/2006 | Yun et al. |
| 2006/0040655 | A1 | 2/2006 | Kim et al. |
| 2006/0045003 | A1 | 3/2006 | Choi et al. |
| 2006/0050770 | A1 | 3/2006 | Wallace et al. |
| 2006/0056340 | A1 | 3/2006 | Hottinen et al. |
| 2006/0057958 | A1 | 3/2006 | Ngo et al. |
| 2006/0067421 | A1 | 3/2006 | Walton et al. |
| 2006/0078075 | A1 | 4/2006 | Stamoulis et al. |
| 2006/0083159 | A1 | 4/2006 | Laroia et al. |
| 2006/0083183 | A1 | 4/2006 | Teague et al. |
| 2006/0089104 | A1 | 4/2006 | Kaikkonen et al. |
| 2006/0092054 | A1 | 5/2006 | Li et al. |
| 2006/0093065 | A1 | 5/2006 | Thomas et al. |
| 2006/0104333 | A1 | 5/2006 | Rainbolt et al. |
| 2006/0104381 | A1 | 5/2006 | Menon et al. |
| 2006/0107171 | A1 | 5/2006 | Skraparlis |
| 2006/0109814 | A1 | 5/2006 | Kuzminskiy et al. |
| 2006/0111054 | A1 | 5/2006 | Pan et al. |
| 2006/0111148 | A1 | 5/2006 | Mukkavilli et al. |
| 2006/0114858 | A1 | 6/2006 | Walton et al. |
| 2006/0120469 | A1 | 6/2006 | Maltsev et al. |
| 2006/0120471 | A1 | 6/2006 | Learned et al. |
| 2006/0126491 | A1 | 6/2006 | Ro et al. |
| 2006/0133269 | A1 | 6/2006 | Prakash et al. |
| 2006/0133455 | A1 | 6/2006 | Agrawal et al. |
| 2006/0133521 | A1 | 6/2006 | Sampath et al. |
| 2006/0140289 | A1 | 6/2006 | Mandyam et al. |
| 2006/0153239 | A1 | 7/2006 | Julian et al. |
| 2006/0155534 | A1 | 7/2006 | Lin et al. |
| 2006/0156199 | A1 | 7/2006 | Palanki et al. |
| 2006/0172704 | A1 | 8/2006 | Nishio et al. |
| 2006/0189321 | A1 | 8/2006 | Oh et al. |
| 2006/0193294 | A1 | 8/2006 | Jorswieck et al. |
| 2006/0203708 | A1 | 9/2006 | Sampath et al. |
| 2006/0203794 | A1 | 9/2006 | Sampath et al. |
| 2006/0203891 | A1 | 9/2006 | Sampath et al. |
| 2006/0203932 | A1 | 9/2006 | Palanki et al. |
| 2006/0209670 | A1 | 9/2006 | Gorokhov et al. |
| 2006/0209732 | A1 | 9/2006 | Gorokhov et al. |
| 2006/0209754 | A1 | 9/2006 | Ji et al. |
| 2006/0209764 | A1 | 9/2006 | Kim et al. |
| 2006/0209973 | A1 | 9/2006 | Gorokhov et al. |
| 2006/0215777 | A1 | 9/2006 | Krishnamoorthi |
| 2006/0218459 | A1 | 9/2006 | Hedberg |
| 2006/0223449 | A1 | 10/2006 | Sampath et al. |
| 2006/0233124 | A1 | 10/2006 | Palanki et al. |
| 2006/0233131 | A1 | 10/2006 | Gore et al. |
| 2006/0233222 | A1 | 10/2006 | Reial et al. |
| 2006/0262754 | A1 | 11/2006 | Andersson et al. |
| 2006/0270427 | A1 | 11/2006 | Shida et al. |
| 2006/0274836 | A1 | 12/2006 | Sampath et al. |
| 2006/0280114 | A1 | 12/2006 | Osseiran et al. |
| 2006/0285485 | A1 | 12/2006 | Agrawal et al. |
| 2006/0285515 | A1 | 12/2006 | Julian et al. |
| 2006/0286974 | A1 | 12/2006 | Gore et al. |
| 2006/0286982 | A1 | 12/2006 | Prakash et al. |
| 2006/0286995 | A1 | 12/2006 | Onggosanusi et al. |
| 2006/0291371 | A1 | 12/2006 | Sutivong et al. |
| 2006/0292989 | A1 | 12/2006 | Gerlach et al. |
| 2007/0004430 | A1 | 1/2007 | Hyun et al. |
| 2007/0005749 | A1 | 1/2007 | Sampath |
| 2007/0009011 | A1 | 1/2007 | Coulson et al. |
| 2007/0019596 | A1 | 1/2007 | Barriac et al. |
| 2007/0025345 | A1 | 2/2007 | Bachl et al. |
| 2007/0041311 | A1 | 2/2007 | Baum et al. |
| 2007/0041404 | A1 | 2/2007 | Palanki et al. |
| 2007/0041457 | A1 | 2/2007 | Kadous et al. |
| 2007/0047485 | A1 | 3/2007 | Gorokhov et al. |
| 2007/0047495 | A1 | 3/2007 | Ji et al. |
| 2007/0049218 | A1 | 3/2007 | Gorokhov et al. |
| 2007/0053282 | A1 | 3/2007 | Tong et al. |
| 2007/0053383 | A1 | 3/2007 | Choi et al. |
| 2007/0060178 | A1 | 3/2007 | Gorokhov et al. |
| 2007/0064669 | A1 | 3/2007 | Classon et al. |
| 2007/0070952 | A1 | 3/2007 | Yoon et al. |
| 2007/0071147 | A1 | 3/2007 | Sampath et al. |
| 2007/0097853 | A1 | 5/2007 | Khandekar et al. |
| 2007/0097889 | A1 | 5/2007 | Wang et al. |
| 2007/0097897 | A1 | 5/2007 | Teague et al. |
| 2007/0097908 | A1 | 5/2007 | Khandekar et al. |
| 2007/0097909 | A1 | 5/2007 | Khandekar et al. |
| 2007/0097910 | A1 | 5/2007 | Ji et al. |
| 2007/0097922 | A1 | 5/2007 | Parekh et al. |
| 2007/0097927 | A1 | 5/2007 | Gorokhov et al. |
| 2007/0097942 | A1 | 5/2007 | Gorokhov et al. |
| 2007/0097981 | A1 | 5/2007 | Papasakellariou et al. |
| 2007/0098050 | A1 | 5/2007 | Khandekar et al. |
| 2007/0098120 | A1 | 5/2007 | Wang |
| 2007/0099666 | A1 | 5/2007 | Astely et al. |
| 2007/0110172 | A1 | 5/2007 | Faulkner et al. |
| 2007/0115795 | A1 | 5/2007 | Gore et al. |
| 2007/0149194 | A1 | 6/2007 | Das et al. |
| 2007/0149228 | A1 | 6/2007 | Das |
| 2007/0159969 | A1 | 7/2007 | Das et al. |
| 2007/0160115 | A1 | 7/2007 | Palanki et al. |
| 2007/0165738 | A1 | 7/2007 | Barriac et al. |
| 2007/0177631 | A1 | 8/2007 | Popovic et al. |
| 2007/0177681 | A1 | 8/2007 | Choi et al. |
| 2007/0183303 | A1 | 8/2007 | Pi et al. |
| 2007/0183386 | A1 | 8/2007 | Muharemovic et al. |
| 2007/0207812 | A1 | 9/2007 | Borran et al. |
| 2007/0211616 | A1 | 9/2007 | Khandekar et al. |
| 2007/0211667 | A1 | 9/2007 | Agrawal et al. |
| 2007/0230324 | A1 | 10/2007 | Li et al. |
| 2007/0242653 | A1 | 10/2007 | Yang et al. |
| 2007/0263743 | A1 | 11/2007 | Lee et al. |
| 2007/0280336 | A1 | 12/2007 | Zhang et al. |
| 2007/0281702 | A1 | 12/2007 | Lim et al. |
| 2008/0039129 | A1 | 2/2008 | Li et al. |
| 2008/0063099 | A1 | 3/2008 | Laroia et al. |
| 2008/0095223 | A1 | 4/2008 | Tong et al. |
| 2008/0095262 | A1 | 4/2008 | Ho et al. |
| 2008/0151829 | A1 | 6/2008 | Khandekar et al. |
| 2008/0181139 | A1 | 7/2008 | Rangarajan et al. |
| 2008/0214222 | A1 | 9/2008 | Atarashi et al. |
| 2008/0253279 | A1 | 10/2008 | Ma et al. |
| 2008/0267157 | A1 | 10/2008 | Lee et al. |
| 2008/0299983 | A1 | 12/2008 | Kwak et al. |
| 2009/0003466 | A1 | 1/2009 | Taherzadehboroujeni et al. |
| 2009/0010351 | A1 | 1/2009 | Laroia et al. |
| 2009/0022098 | A1 | 1/2009 | Novak et al. |
| 2009/0041150 | A1 | 2/2009 | Tsai et al. |
| 2009/0110103 | A1 | 4/2009 | Maltsev et al. |
| 2009/0129501 | A1 | 5/2009 | Mehta et al. |
| 2009/0180459 | A1 | 7/2009 | Orlik et al. |
| 2009/0197646 | A1 | 8/2009 | Tamura et al. |
| 2009/0201872 | A1 | 8/2009 | Gorokhov et al. |
| 2009/0213750 | A1 | 8/2009 | Gorokhov et al. |
| 2009/0213950 | A1 | 8/2009 | Gorokhov et al. |
| 2009/0262641 | A1 | 10/2009 | Laroia et al. |
| 2009/0262699 | A1 | 10/2009 | Wengerter et al. |
| 2009/0285163 | A1 | 11/2009 | Zhang et al. |
| 2009/0287977 | A1 | 11/2009 | Chang et al. |
| 2010/0002570 | A9 | 1/2010 | Walton et al. |
| 2010/0135242 | A1 | 6/2010 | Nam et al. |
| 2010/0220800 | A1 | 9/2010 | Erell et al. |
| 2010/0232384 | A1 | 9/2010 | Farajidana et al. |
| 2010/0238902 | A1 | 9/2010 | Ji et al. |
| 2010/0254263 | A1 | 10/2010 | Chen et al. |
| 2011/0064070 | A1 | 3/2011 | Gore et al. |
| 2011/0235733 | A1 | 9/2011 | Laroia et al. |
| 2011/0235745 | A1 | 9/2011 | Laroia et al. |
| 2011/0235746 | A1 | 9/2011 | Laroia et al. |
| 2011/0235747 | A1 | 9/2011 | Laroia et al. |
| 2011/0306291 | A1 | 12/2011 | Ma et al. |
| 2012/0002623 | A1 | 1/2012 | Khandekar et al. |
| 2012/0063441 | A1 | 3/2012 | Palanki |
| 2012/0120925 | A1 | 5/2012 | Kadous et al. |
| 2012/0140798 | A1 | 6/2012 | Kadous et al. |
| 2012/0140838 | A1 | 6/2012 | Kadous et al. |
| 2013/0016678 | A1 | 1/2013 | Laroia et al. |
| 2013/0208681 | A1 | 8/2013 | Gore et al. |
| 2013/0287138 | A1 | 10/2013 | Ma et al. |

(56) References Cited

U.S. PATENT DOCUMENTS

| | | | |
|---|---|---|---|
| 2013/0315200 | A1 | 11/2013 | Gorokhov et al. |
| 2014/0247898 | A1 | 9/2014 | Laroia et al. |
| 2014/0376518 | A1 | 12/2014 | Palanki et al. |

FOREIGN PATENT DOCUMENTS

| | | | |
|---|---|---|---|
| CA | 2540688 | | 5/2005 |
| CA | 2577369 | | 3/2006 |
| CL | 14001993 | | 12/1994 |
| CL | 8461997 | | 1/1998 |
| CL | 9531997 | | 1/1998 |
| CL | 27102004 | | 8/2005 |
| CL | 22892004 | | 9/2005 |
| CL | 30862004 | | 10/2005 |
| CL | 29932005 | | 5/2006 |
| CL | 29012006 | | 10/2006 |
| CL | 29022006 | | 10/2006 |
| CL | 29032006 | | 10/2006 |
| CL | 29042006 | | 10/2006 |
| CL | 29062006 | | 10/2006 |
| CL | 29082006 | | 10/2006 |
| CL | 15202006 | | 12/2006 |
| CL | 22032006 | | 2/2007 |
| CL | 15212006 | | 3/2007 |
| CL | 14922006 | | 4/2007 |
| CL | 14892006 | | 5/2007 |
| CL | 14902006 | | 5/2007 |
| CL | 46151 | | 12/2009 |
| CL | 29072006 | | 1/2010 |
| CN | 1252919 | | 5/2000 |
| CN | 1267437 | | 9/2000 |
| CN | 1284795 | | 2/2001 |
| CN | 1296682 | | 5/2001 |
| CN | 1344451 | | 4/2002 |
| CN | 1346221 | | 4/2002 |
| CN | 1383631 | | 12/2002 |
| CN | 1386344 | | 12/2002 |
| CN | 1402916 | A | 3/2003 |
| CN | 1424835 | | 6/2003 |
| CN | 1132474 | C | 12/2003 |
| CN | 1467938 | A | 1/2004 |
| CN | 1487755 | A | 4/2004 |
| CN | 1520220 | | 8/2004 |
| CN | 1525678 | | 9/2004 |
| CN | 1636346 | | 7/2005 |
| CN | 1642051 | A | 7/2005 |
| CN | 1642335 | A | 7/2005 |
| CN | 1647436 | | 7/2005 |
| DE | 19800653 | A1 | 7/1999 |
| DE | 19800953 | | 7/1999 |
| DE | 19957286 | | 5/2001 |
| DE | 10240138 | | 8/2003 |
| DE | 10254384 | | 6/2004 |
| EP | 0488976 | | 6/1992 |
| EP | 0568291 | A2 | 11/1993 |
| EP | 0740431 | A1 | 10/1996 |
| EP | 0786889 | A1 | 7/1997 |
| EP | 0805576 | A2 | 11/1997 |
| EP | 0807989 | A1 | 11/1997 |
| EP | 0844796 | | 5/1998 |
| EP | 0981222 | A2 | 2/2000 |
| EP | 1001570 | A2 | 5/2000 |
| EP | 1047209 | A1 | 10/2000 |
| EP | 1061667 | | 12/2000 |
| EP | 1091516 | A1 | 4/2001 |
| EP | 1093241 | A1 | 4/2001 |
| EP | 1148673 | A2 | 10/2001 |
| EP | 1172983 | A2 | 1/2002 |
| EP | 1180907 | A2 | 2/2002 |
| EP | 1187506 | A1 | 3/2002 |
| EP | 1204217 | | 5/2002 |
| EP | 1255369 | | 11/2002 |
| EP | 1267513 | | 12/2002 |
| EP | 1074099 | B1 | 2/2003 |
| EP | 1286490 | | 2/2003 |
| EP | 1335504 | A2 | 8/2003 |
| EP | 1351538 | A1 | 10/2003 |
| EP | 1376920 | | 1/2004 |
| EP | 1392073 | A1 | 2/2004 |
| EP | 1434365 | A2 | 6/2004 |
| EP | 1441469 | A2 | 7/2004 |
| EP | 1445873 | A2 | 8/2004 |
| EP | 1465449 | A1 | 10/2004 |
| EP | 1478204 | A2 | 11/2004 |
| EP | 1507421 | | 2/2005 |
| EP | 1513356 | A2 | 3/2005 |
| EP | 1531575 | A2 | 5/2005 |
| EP | 1533950 | | 5/2005 |
| EP | 1536863 | | 6/2005 |
| EP | 1542488 | A1 | 6/2005 |
| EP | 1601149 | A2 | 11/2005 |
| EP | 1643669 | A1 | 4/2006 |
| EP | 1898542 | A1 | 3/2008 |
| EP | 1941693 | | 7/2011 |
| FR | 2584884 | | 1/1987 |
| GB | 2279540 | A | 1/1995 |
| GB | 2346776 | | 10/2000 |
| GB | 2412541 | A | 9/2005 |
| IL | 167573 | | 2/2011 |
| IL | 201872 | | 5/2012 |
| JP | H04111544 | A | 4/1992 |
| JP | 4301931 | A | 10/1992 |
| JP | H0746248 | A | 2/1995 |
| JP | 7336323 | A | 12/1995 |
| JP | 8116329 | A | 5/1996 |
| JP | 08288927 | | 11/1996 |
| JP | 9008725 | A | 1/1997 |
| JP | H09501548 | A | 2/1997 |
| JP | 9131342 | | 5/1997 |
| JP | 9182148 | A | 7/1997 |
| JP | 09214404 | | 8/1997 |
| JP | 9284200 | A | 10/1997 |
| JP | 10117162 | | 5/1998 |
| JP | H10210000 | A | 8/1998 |
| JP | 10322304 | | 12/1998 |
| JP | H11168453 | A | 6/1999 |
| JP | 11191756 | A | 7/1999 |
| JP | 11196109 | | 7/1999 |
| JP | 11508417 | T | 7/1999 |
| JP | 11239155 | A | 8/1999 |
| JP | 11298954 | | 10/1999 |
| JP | 11331927 | A | 11/1999 |
| JP | 2000022618 | A | 1/2000 |
| JP | 2000102065 | A | 4/2000 |
| JP | 2000184425 | | 6/2000 |
| JP | 2000511750 | A | 9/2000 |
| JP | 2000332724 | A | 11/2000 |
| JP | 2001016644 | A2 | 1/2001 |
| JP | 2001045573 | A | 2/2001 |
| JP | 2001057545 | A | 2/2001 |
| JP | 2001156732 | A | 6/2001 |
| JP | 2001238269 | | 8/2001 |
| JP | 2001245355 | A | 9/2001 |
| JP | 2001249802 | | 9/2001 |
| JP | 2001285927 | A | 10/2001 |
| JP | 2001521698 | A | 11/2001 |
| JP | 2001526012 | | 12/2001 |
| JP | 2002026790 | | 1/2002 |
| JP | 2002111556 | A | 4/2002 |
| JP | 2002515203 | T | 5/2002 |
| JP | 2002290148 | A | 10/2002 |
| JP | 2002534925 | A | 10/2002 |
| JP | 2002534941 | | 10/2002 |
| JP | 2002538696 | A | 11/2002 |
| JP | 200318054 | | 1/2003 |
| JP | 2003032218 | | 1/2003 |
| JP | 2003500909 | | 1/2003 |
| JP | 200369472 | | 3/2003 |
| JP | 2003101515 | | 4/2003 |
| JP | 2003169367 | A | 6/2003 |
| JP | 2003174426 | | 6/2003 |
| JP | 2003199173 | A | 7/2003 |
| JP | 2003520523 | | 7/2003 |

(56) References Cited

FOREIGN PATENT DOCUMENTS

| | | | |
|---|---|---|---|
| JP | 2003235072 | A | 8/2003 |
| JP | 2003249907 | A | 9/2003 |
| JP | 2003292667 | A | 10/2003 |
| JP | 2003318857 | A | 11/2003 |
| JP | 2003347985 | | 12/2003 |
| JP | 2003348047 | | 12/2003 |
| JP | 2003536308 | A | 12/2003 |
| JP | 2004007643 | A | 1/2004 |
| JP | 2004023716 | | 1/2004 |
| JP | 2004048716 | | 2/2004 |
| JP | 200472457 | | 3/2004 |
| JP | 2004072157 | A | 3/2004 |
| JP | 2004096142 | | 3/2004 |
| JP | 2004507151 | A | 3/2004 |
| JP | 2004507950 | A | 3/2004 |
| JP | 2004153676 | | 5/2004 |
| JP | 2004158901 | A | 6/2004 |
| JP | 2004162388 | A | 6/2004 |
| JP | 2004194262 | A | 7/2004 |
| JP | 2004201296 | A | 7/2004 |
| JP | 2004215022 | A | 7/2004 |
| JP | 2004221972 | | 8/2004 |
| JP | 2004266818 | | 9/2004 |
| JP | 2004529524 | T | 9/2004 |
| JP | 2004297276 | A | 10/2004 |
| JP | 2004297370 | A | 10/2004 |
| JP | 2004297756 | | 10/2004 |
| JP | 2004534456 | | 11/2004 |
| JP | 2004535106 | A | 11/2004 |
| JP | 2005006337 | | 1/2005 |
| JP | 2005020530 | A | 1/2005 |
| JP | 2005502218 | T | 1/2005 |
| JP | 2005506757 | | 3/2005 |
| JP | 2005110130 | A | 4/2005 |
| JP | 2005130491 | A | 5/2005 |
| JP | 2005167502 | A | 6/2005 |
| JP | 2005197772 | | 7/2005 |
| JP | 2005203961 | | 7/2005 |
| JP | 2005521327 | | 7/2005 |
| JP | 2005521358 | | 7/2005 |
| JP | 2005236678 | A | 9/2005 |
| JP | 2006505172 | | 2/2006 |
| JP | 2006505230 | A | 2/2006 |
| JP | 2006506860 | A | 2/2006 |
| JP | 2006211537 | A | 8/2006 |
| JP | 2006518173 | A | 8/2006 |
| JP | 2006524930 | A | 11/2006 |
| JP | 2007500486 | A | 1/2007 |
| JP | 2007503790 | | 2/2007 |
| JP | 2007519281 | | 7/2007 |
| JP | 2007525043 | A | 8/2007 |
| JP | 2007527127 | | 9/2007 |
| JP | 2008505587 | A | 2/2008 |
| JP | 2008535398 | | 8/2008 |
| JP | 4188372 | B2 | 11/2008 |
| JP | 2008546314 | | 12/2008 |
| JP | 04694628 | | 6/2011 |
| KR | 0150275 | B1 | 11/1998 |
| KR | 20000060428 | | 10/2000 |
| KR | 100291476 | B1 | 3/2001 |
| KR | 20010056333 | | 4/2001 |
| KR | 20010087715 | A | 9/2001 |
| KR | 20030007965 | | 1/2003 |
| KR | 20030035969 | A | 5/2003 |
| KR | 20040063057 | | 7/2004 |
| KR | 200471652 | | 8/2004 |
| KR | 20040103441 | A | 12/2004 |
| KR | 20050061559 | | 6/2005 |
| KR | 20050063826 | A | 6/2005 |
| KR | 100606099 | | 7/2006 |
| RU | 95121152 | | 12/1997 |
| RU | 2141168 | | 11/1999 |
| RU | 2141706 | C1 | 11/1999 |
| RU | 2159007 | C2 | 11/2000 |
| RU | 2162275 | C2 | 1/2001 |
| RU | 2183387 | C2 | 6/2002 |
| RU | 2192094 | C1 | 10/2002 |
| RU | 2197778 | C2 | 1/2003 |
| RU | 2201033 | C2 | 3/2003 |
| RU | 2207723 | C1 | 6/2003 |
| RU | 2208913 | | 7/2003 |
| RU | 2210866 | C2 | 8/2003 |
| RU | 2216101 | C2 | 11/2003 |
| RU | 2216103 | C2 | 11/2003 |
| RU | 2216105 | C2 | 11/2003 |
| RU | 2225080 | C2 | 2/2004 |
| RU | 2235429 | | 8/2004 |
| RU | 2235432 | C2 | 8/2004 |
| RU | 2237379 | C2 | 9/2004 |
| RU | 2238611 | C1 | 10/2004 |
| RU | 2242091 | C2 | 12/2004 |
| RU | 2003125268 | | 2/2005 |
| RU | 2285388 | | 3/2005 |
| RU | 2250564 | | 4/2005 |
| RU | 2257008 | | 7/2005 |
| RU | 2267224 | | 12/2005 |
| RU | 2005129079 | A | 2/2006 |
| RU | 2285338 | C2 | 10/2006 |
| RU | 2285351 | C2 | 10/2006 |
| RU | 2292655 | | 1/2007 |
| RU | 2335864 | C2 | 10/2008 |
| RU | 2349043 | C2 | 3/2009 |
| SU | 1320883 | | 6/1987 |
| TW | 508960 | B | 11/2002 |
| TW | 510132 | | 11/2002 |
| TW | 200302642 | | 8/2003 |
| TW | 200401572 | | 1/2004 |
| TW | I232040 | | 5/2005 |
| TW | 248266 | | 1/2006 |
| TW | 200718128 | | 5/2007 |
| WO | WO9408432 | | 4/1994 |
| WO | WO-9521494 | A1 | 8/1995 |
| WO | WO9613920 | A1 | 5/1996 |
| WO | WO9701256 | | 1/1997 |
| WO | WO9737456 | A2 | 10/1997 |
| WO | WO-9746033 | A2 | 12/1997 |
| WO | WO-9800946 | A2 | 1/1998 |
| WO | WO-9814026 | A1 | 4/1998 |
| WO | WO9837706 | A2 | 8/1998 |
| WO | WO9848581 | A1 | 10/1998 |
| WO | WO9853561 | | 11/1998 |
| WO | WO9854919 | A2 | 12/1998 |
| WO | WO-9941871 | A1 | 8/1999 |
| WO | WO-9944313 | A1 | 9/1999 |
| WO | WO-9944383 | A1 | 9/1999 |
| WO | WO-9952250 | A1 | 10/1999 |
| WO | WO9953713 | | 10/1999 |
| WO | WO-9959265 | A1 | 11/1999 |
| WO | WO9960729 | A1 | 11/1999 |
| WO | 0004728 | | 1/2000 |
| WO | WO0002397 | | 1/2000 |
| WO | WO0033503 | | 6/2000 |
| WO | 0051389 | A1 | 8/2000 |
| WO | WO0070897 | | 11/2000 |
| WO | WO0101596 | | 1/2001 |
| WO | WO0117125 | A1 | 3/2001 |
| WO | WO0126269 | | 4/2001 |
| WO | WO-0139523 | A2 | 5/2001 |
| WO | WO0145300 | | 6/2001 |
| WO | WO0148969 | | 7/2001 |
| WO | WO-0158054 | A1 | 8/2001 |
| WO | WO-0160106 | A1 | 8/2001 |
| WO | 0165637 | A2 | 9/2001 |
| WO | WO0169814 | A1 | 9/2001 |
| WO | 0162544 | | 11/2001 |
| WO | WO0182543 | | 11/2001 |
| WO | WO-0189112 | A1 | 11/2001 |
| WO | WO0193505 | | 12/2001 |
| WO | WO-0195427 | A2 | 12/2001 |
| WO | WO-0204936 | A1 | 1/2002 |
| WO | WO0207375 | | 1/2002 |
| WO | 0215432 | A1 | 2/2002 |
| WO | WO0215616 | | 2/2002 |
| WO | WO0219746 | | 3/2002 |

(56) References Cited

FOREIGN PATENT DOCUMENTS

| | | | |
|---|---|---|---|
| WO | WO-0231991 | A2 | 4/2002 |
| WO | WO-0233848 | A2 | 4/2002 |
| WO | 0245293 | A2 | 6/2002 |
| WO | WO0245456 | A1 | 6/2002 |
| WO | WO0249305 | | 6/2002 |
| WO | WO0249306 | | 6/2002 |
| WO | WO0249385 | A2 | 6/2002 |
| WO | WO02060138 | | 8/2002 |
| WO | WO02065675 | | 8/2002 |
| WO | WO02082689 | A2 | 10/2002 |
| WO | WO02082743 | | 10/2002 |
| WO | WO02089434 | A1 | 11/2002 |
| WO | WO02093782 | A1 | 11/2002 |
| WO | WO02093819 | A1 | 11/2002 |
| WO | WO02100027 | A1 | 12/2002 |
| WO | WO03001696 | | 1/2003 |
| WO | WO03001761 | A1 | 1/2003 |
| WO | WO-03001981 | A2 | 1/2003 |
| WO | WO-03003617 | A2 | 1/2003 |
| WO | WO03019819 | | 3/2003 |
| WO | WO03030414 | | 4/2003 |
| WO | WO03034644 | A1 | 4/2003 |
| WO | WO03043262 | | 5/2003 |
| WO | WO03043369 | | 5/2003 |
| WO | 03049409 | A2 | 6/2003 |
| WO | WO03058871 | A1 | 7/2003 |
| WO | 03069816 | A2 | 8/2003 |
| WO | WO03067783 | | 8/2003 |
| WO | WO03069832 | A1 | 8/2003 |
| WO | WO03073646 | | 9/2003 |
| WO | WO03075479 | | 9/2003 |
| WO | WO03085876 | | 10/2003 |
| WO | WO03088538 | A1 | 10/2003 |
| WO | WO03094384 | | 11/2003 |
| WO | WO03103331 | | 12/2003 |
| WO | WO2004002047 | A1 | 12/2003 |
| WO | WO2004004370 | | 1/2004 |
| WO | WO2004008671 | | 1/2004 |
| WO | WO-2004008681 | A1 | 1/2004 |
| WO | WO2004015912 | | 2/2004 |
| WO | WO2004016007 | | 2/2004 |
| WO | WO2004021605 | A1 | 3/2004 |
| WO | WO2004023834 | A1 | 3/2004 |
| WO | 2004028037 | A1 | 4/2004 |
| WO | WO-2004030238 | A1 | 4/2004 |
| WO | WO-2004032443 | A1 | 4/2004 |
| WO | 2004038984 | A2 | 5/2004 |
| WO | 2004040825 | | 5/2004 |
| WO | WO2004004827 | | 5/2004 |
| WO | WO2004038954 | | 5/2004 |
| WO | WO-2004038972 | A1 | 5/2004 |
| WO | WO-2004038988 | A2 | 5/2004 |
| WO | WO-2004040690 | A2 | 5/2004 |
| WO | WO2004047354 | | 6/2004 |
| WO | WO2004049618 | A1 | 6/2004 |
| WO | WO-2004051872 | A2 | 6/2004 |
| WO | 2004056022 | A2 | 7/2004 |
| WO | WO2004062255 | | 7/2004 |
| WO | WO2004064294 | | 7/2004 |
| WO | WO2004064295 | | 7/2004 |
| WO | WO2004066520 | | 8/2004 |
| WO | WO2004068721 | A2 | 8/2004 |
| WO | WO-2004073276 | A1 | 8/2004 |
| WO | WO2004075023 | | 9/2004 |
| WO | WO2004075442 | | 9/2004 |
| WO | WO2004075448 | | 9/2004 |
| WO | WO2004075468 | | 9/2004 |
| WO | WO2004075596 | | 9/2004 |
| WO | WO2004077850 | A2 | 9/2004 |
| WO | WO2004084509 | | 9/2004 |
| WO | WO-2004086706 | A1 | 10/2004 |
| WO | WO2004086711 | | 10/2004 |
| WO | WO2004095730 | A1 | 11/2004 |
| WO | WO2004095851 | | 11/2004 |
| WO | WO2004095854 | | 11/2004 |
| WO | WO2004098072 | | 11/2004 |
| WO | WO2004098222 | | 11/2004 |
| WO | WO2004102815 | | 11/2004 |
| WO | WO2004102816 | A2 | 11/2004 |
| WO | 2004114564 | A1 | 12/2004 |
| WO | 2004114615 | A1 | 12/2004 |
| WO | WO2004105272 | A1 | 12/2004 |
| WO | WO 2004114549 | A1 * | 12/2004 |
| WO | WO2005002253 | A1 | 1/2005 |
| WO | 2005011163 | A1 | 2/2005 |
| WO | 2005018270 | | 2/2005 |
| WO | WO-2005015795 | A1 | 2/2005 |
| WO | WO-2005015797 | A1 | 2/2005 |
| WO | WO2005015810 | | 2/2005 |
| WO | WO2005015941 | | 2/2005 |
| WO | WO2005020488 | A1 | 3/2005 |
| WO | WO2005020490 | | 3/2005 |
| WO | WO2005022811 | A2 | 3/2005 |
| WO | WO2005025110 | A2 | 3/2005 |
| WO | WO2005032004 | A1 | 4/2005 |
| WO | 2005043780 | A1 | 5/2005 |
| WO | WO2005043855 | | 5/2005 |
| WO | WO2005046080 | | 5/2005 |
| WO | WO-2005055465 | A1 | 6/2005 |
| WO | WO2005055484 | A1 | 6/2005 |
| WO | WO2005055527 | | 6/2005 |
| WO | WO2005060192 | A1 | 6/2005 |
| WO | WO2005065062 | | 7/2005 |
| WO | WO-2005069538 | A1 | 7/2005 |
| WO | WO2005074184 | | 8/2005 |
| WO | 2005086440 | A1 | 9/2005 |
| WO | WO2005096538 | | 10/2005 |
| WO | WO2005122628 | | 12/2005 |
| WO | 2006007292 | A2 | 1/2006 |
| WO | WO2006019710 | | 2/2006 |
| WO | WO2006026344 | | 3/2006 |
| WO | WO2006044487 | | 4/2006 |
| WO | 2006062356 | A1 | 6/2006 |
| WO | 2006069301 | | 6/2006 |
| WO | WO2006069300 | | 6/2006 |
| WO | WO2006069397 | | 6/2006 |
| WO | WO2006077696 | | 7/2006 |
| WO | WO 2006096784 | A1 | 9/2006 |
| WO | WO-2006099349 | A1 | 9/2006 |
| WO | WO-2006099545 | A1 | 9/2006 |
| WO | WO-2006099577 | A1 | 9/2006 |
| WO | WO-2006127544 | A2 | 11/2006 |
| WO | WO2006134032 | | 12/2006 |
| WO | WO2006138196 | | 12/2006 |
| WO | WO2006138573 | | 12/2006 |
| WO | WO2006138581 | A2 | 12/2006 |
| WO | 2007022430 | A2 | 2/2007 |
| WO | WO2007024934 | | 3/2007 |
| WO | WO-2007024935 | A2 | 3/2007 |
| WO | WO2007025160 | | 3/2007 |
| WO | WO-2007051159 | A2 | 5/2007 |

OTHER PUBLICATIONS

Yun et al., "Performance of an LDPC-Coded Frequency-Hopping QFDMA System Based on Resource Allocation in the Uplink" Vehicular Technology—Conference 2004. VTO 2004-Spring, 2004 IEEE 59th Milan, Italy May 17-19, 2004, Piscataway, NJ, USA, vol. 4, May 17, 2004. pp. 1925-1928. XP010766497.

Digital cellular telecommunications system (Phase 2+); Mobile radio interface layer 3 specification (GSM 04.08 version 7.7.1 Release 1998); ETSI EN 300 940 V7.7.7 (Oct. 2000). pp. 1,2,91-93.

Favre et al: "Self-Adaptive Transmission Procedure" IBM Technical Disclosure Bulletin, IBM Corporation, Sep. 1976, vol. 19, No. 4, pp. 1283-1284, New York, New York.

Groe, et al., "CDMA Mobile Radio Design," Sep. 26, 2001, Artech House, Norwood, MA 02062, pp. 257-259.

Laroia, R. et al.: "An integrated approach based on cross-layer optimization—Designing a mobile broadband wireless access network" IEEE Signal Processing Magazine, IEEE Service Center, Piscataway, NJ, US. vol. 21, No. 5, Sep. 2004, pp. 20-28, XP011116149.

Lau, et al., "On the Design of MIMO Block-Fading Channels with Feedback-Link Capacity Constraint," IEEE Transactions on Com-

(56) References Cited

OTHER PUBLICATIONS munications, IEEE Service Center, Piscataway, NJ, US, v. 52, No. 1, Jan. 2004, pp. 62-70, XP001189908.
Lettieri et al: "Adaptive frame length control for improving wireless link throughput, range, and energy efficiency", INFOCOM 98, 17th Annual Joint Conference of the IEEE Computer and Communications Societies, Mar. 29-Apr. 2, 1998, pp. 564-571, vol. 2, IEEE San Francisco. CA, New York, New York.
Molisch, et al, MIMO systems with antenna selection, IEEE Microwave Magazine, URL: http://ieeexplore.ieee.org/iel5/6658/28677/01284943.pdf, Retrieved on Dec. 8, 2006. pp. 46-56 (2004).
Tomcik, J.: "OFDD Technology Overview Presentation," IEEE 802. 20 Working Group on Mobile Broadband Wireless Access, Slides/pp. 1-73, Nov. 15, 2005.
Tomcik, J.: "MBFDD and MBTOO Wideband Mode: Technology Overview," IEEE 802.20 Working Group Mobile Broadband Wireless Access, Jan. 2006, pp. 1-109, XP002429968.
Toufik I et al., "Channel allocation algorithms for multi-carrier systems"; Vehicular Technology Conference, 2004. VTC2004-FALL. 2004 IEEE 60th Los Angeles, CA, USA Sep. 26-29, 2004, pp. 1129-1133, XP010786798, ISBN: 07-7803-8521-7.
TIA-1121.001 "Physical Layer for Ultra Mobile Broadband (UMB) Air Interface Specification," 3GPP2 C:S0084-001-0, Version 2.0 (Aug. 2007).
TIA-1121.002 "Medium Access Control Layer for Ultra Mobile Broadband (UMB) Air Interface Specification," 3GPP2 C.S0084-002-0, Version 2.0 (Aug. 2007).
International Preliminary Report on Patentability—PCT/US05/032901, The International Bureau of WIPO, Geneva, Switzerland—Feb. 26, 2008.
International Search Report—PCT/US06/032901—International Search Authority—European Patent Office, Mar. 23, 2007.
Written Opinion—PCT/US06/032901—International Search Authority—European Patent Office, Mar. 23, 2007.
3rd Generation Partnership Project; Technical Specification Group Radio Access Network; Physical Layer Aspects for Evolved UTRA (Release 7), 3GPP TR 25.814 v0.3.1 (Nov. 2005).
Bahai, Saltzberg; "System Architecture," Multi-Carrier Digital Communications, Kluwer Academic, New York, NY, XP-002199501, 1999, p. 17-21.
Bingham: "Other Types of MCM," ADSL, VDSL, and Multicarrier Modulation, John wiley & Sons, New York, XP-002199502. 2000, pp. 111-113.
Chennakeshu, et al. "A Comparison of Diversity Schemes for a Mixed-Mode Slow Frequency-Hopped Cellular System," IEEE, 1993, pp. 1749-1753.
Chennakeshu, et al, "Capacity Analysis of a TDMA-Based Slow-Frequency-Hopped Cellular System," IEEE Transaction on Vehicular Technology. vol. 45., No. 3 Aug. 1996, pp, 531-542.
Chiani, et al. "Outage Evaluation for Slow Frequency-Hopping Mobile Radio Systems" IEEE Transactions on Communications, vol. 47, No. 12, pp. 1865-1874, Dec. 1999.
Choi, et al., "Design of the Optimum Pilot Pattern for Channel Estimation in OFDM Systems," Global Telecommunications Conference, IEEE Communications Society, Globecom, Dallas, Texas (2004), p. 3661-3665.
Czylwik: "Comparison Between Adaptive OFDM and Single Carrier Modulation with Frequency Domain Equalization," IEEE 47th Vehicular Technology Conference, vol. 2, May 4-7, 1997, pp. 865-869.
Das, et al. "On the Reverse Link Interference Structure for Next Generation Cellular Systems," European Microwave Conference. Oct. 11, 2004, pp. 3068-3072.
Dinis, et al., "A Multiple Access Scheme for the Uplink of Broadband Wireless Systems," IEEE Global Telecommunications Conference. 2004, GLOBECOM '04, vol. 6, Nov. 29-Dec. 3, 2004, pp. 3808-3812.
Fuchs, et al., "A Novel Tree-Based Scheduling Algorithm for the Downlink of Multi-User MIMO Systems with ZF Beamforming," IEEE International Conference on Acoustics, Speech, and Signal Processing, 2005, Proceedings, Philadelphia, PA. pp. 1121-1124.
Hermann Rohling et al., : "Performance Comparison of Different Multiple Access Schemes for the Downlink of an OFDM Communication System", Vehicular Technology Conference, 1997, 47th IEEE, vol. 3, May 4-7, 1997, pp. 1365-1369.
Hill, et al., "Cyclic Shifting and Time Inversion of Partial Transmit Sequences to Reduce the Peak-to-Average Power Ratio in OFDM," IEEE International Symposium on Personal, Indoor and Mobile Radio Communications, vol. 2, Sep. 18, 2000, Piscataway. NJ, pp. 1256-1259.
J.S. Chow and J.M. Cioffi: "A cost-effective maximum likelihood reciever for multicarrier systems", Proc. IEEE Int. Conf. on Comm., pp. 948-952, Jun. 1992.
JE, et al. "A Novel Multiple Access Scheme for Uplink Cellular Systems," IEEE Vehicular Technology Conference, Sep. 26, 2004 pp. 984-988.
John B. Groe, Lawrence E. Larson, "CDMA Mobile Radio Design" Sep. 26, 2001, Artech House, Norwood, MA02062 580530, XP002397967, pp. 157-159.
Kaleh: "Channel Equalization for Block Transmission Systems," IEEE Journal on Selected Areas in Communications, vol. 13, No. 1, Jan. 1995, pp. 110-121.
Kappes, J.M., and Sayegh, S. 1 , "Programmable Demultiplexer/ Demodulator Processor," COMSAT Laboratories, IEEE, 1990, pp. 230-234.
Karsten Bruninghaus et al., : "Multi-Carrier Spread Spectrum and It's relationship to Single-Carrier Transmission", Vehicular technology Conference, 1998, VTC 98, 48th IEEE, vol. 3, May 18-21, 1998, pp. 2329-2332.
Keller, et al.: "Adaptive Multicarrier Modulation: A Convenient Framework for Time-Frequency Processing in Wireless Communications," Proceedings of the IEEE, vol. 88, No. 5, May 2000, pp. 611-640.
Kim, et al. "Performance of TDMA System With SFH and 2-Bit Differentially Detected GMSK Over Rayleigh Fading Channel," IEEE Vehicular Technology Conference, Apr. 28, 1996, pp. 789-793.
Kishiyama Y et al.: "Investigation of Optimum Pilot Channel Structure for VSF-OFCDM Broadband Wireless Access in Forward Link", IEEE Vehicular Technology Conference, New York, NY, US, vol. 4, Apr. 22, 2003, p. 139-144.
Kostic, et al. "Dynamic Frequency Hopping in Wireless Cellular Systems—Simulatons of Full-Replacement and Reduced-Overhead Methods," IEEE Vehicular Technology Conference, May 16, 1999, pp. 914-918.
Kostic, et al. "Fundamentals of Dynamic Frequency Hopping in Cellular Systems," IEEE Journal on Selected Areas in Communications, vol. 19, No. 11, Nov. 2001, pp. 2254-2266.
Lacroix, et al.: "A Study of OFDM Parameters for High Data Rate Radio LAN's," 2000 IEEE 51st Vehicular Technology Conference Proceedings, vol. 2, May 15-18, 2000, pp. 1075-1079.
Leon, et al., "Cyclic Delay Diversity for Single Carrier-Cyclic Prefix Systems," Conference Record of the Thiry-Ninth Asilomar Conference on Signals, Systems and Computers, Oct. 28, 2005, Picataway, NJ, pp. 519-523.
Lott: "Comparison of Frequency and Time Domain Differential Modulation in an OFDM System for Wireless ATM," 1999 IEEE 49th Vehicular Technology Conference, vol. 2, Jul. 1999, pp. 877-883.
Mignone, et al.: "CD3-OFDM: A New Channel Estimation Method to Improve the Sectrum Efficiency in Digital Terrestrial Television Systems," International Broadcasting Convention. Sep. 14-18, 1995 Conference Publication No. 413, IEE 1995, pp. 122-128.
Naofal Al-Dhahir: "A Bandwidth-Optimized Reduced-Complexity Equalized Multicarrier Transceiver", IEEE Transactions on Communications, vol. 45, No. 8, Aug. 1997.
Naofal Al-Dhahir: "Optimum Finite-Length Equalization for Multicarrier Transceivers", IEEE Trans on Comm., pp. 56-64, Jan. 1996.
Nassar, Carl R., et al., "High-Performance MC-CDMA via Carrier Interferometry Codes", IEEE Transactions on Vehicular Technology, vol. 50, No. 6, Nov. 2001.

(56) References Cited

OTHER PUBLICATIONS

NTT DoCoMo, et al, "Orthogonal Common Pilot Channel and Scrambling Code in Evolved UTRA Downlink," 3GPP TSG RAN WG1 #42 on LTE, pp. 1-8 (Aug.-Sep. 2005).
Sari, et al., "Transmission Techniques for Digital Terrestrial TV Broadcasting," IEEE Communications Magazine, Feb. 1995, pp. 100-109.
Schnell, et al, "Application of IFDMA to Mobile Radio Transmission," IEEE 1998 International Conference on Universal Personal Communications, vol. 2, Oct. 5-9, 1998, pp. 1267-1272.
Schnell, et al., "A Promising New Wideband Multiple-Access Scheme for Future Mobile Communications Systems," European Transactions on Telecommunications, Wiley & Sons, Chichester, GB, vol. 10, No. 4, Jul. 1999, pp. 417-427.
Shattil et al., "Array Control Systems for Multicarrier Protocols Using a Frequency-Shifted Feedback Cavity", IEEE, 1999.
Sklar: "Formatting and Baseband Transmission", Chapter 2, pp. 54, 104-106.
3GPP TS 33.220 V.1.1.0 XX,XX, "3rd Generation Partnership Project; Technical Specification Group Services and System Aspects; Generic Authentication Architecture (GAA); Generic Bootstrapping Architecture (Release 6)" Feb. 9, 2004, pp. 1-17, figure 4, XP002996023.
Blum, R. et al: "On Optimum MIMO with Antenna Selection," IEEE International Conference on Communications: Conference Proceedings, vol. 1, Apr. 28, 2002, pp. 386-390.
Catreux, S. et al.: "Simulation results for an interference-limited multiple input multiple output cellular system," Global Telecommunications Conference, 2000. GLOBECOM '00. IEEE. Dec. 1, 2000. vol. 2, pp. 1094-1096, http://ieeexplore.ieee.org/ie15/7153/19260/00891306.pdf?tp=&isnumber=19260&arnumber=8913063 &punumber=7153.
Chung, S. et al.: "Low complexity algorithm for rate and power quantization in extended V-BLAST" VTC Fall 2001. IEEE 54th. Vehicular Technology Conference Proceedings. Atlantic City, NJ, Oct. 7-11, 2001, vol. 1 of 4, pp. 910-914, Conf. 54.
Das, Arnab, et al. "Adaptive, asynchronous incremental redundancy (A-IR) with fixed transmission time intervals TTI for HSDPA." IEEE, Personal, Indoor and Mobile Radio Communications, 2002. The 13th IEEE International Symposium on, pp. 1083-1087.
Dierks, et al., "The TLS Protocol", Version 1.0, Network Working Group, Request for Comments 2246, pp. 1-80 (Jan. 1999).
Don Torrieri, "Cellular Frequency-Hopping CDMA Systems," IEEE Vehicular Technology Conference, May 16, 1999, pp. 919-925, vol. 2.
El Gamal, H. et al.: "Universal Space-Time Coding," IEEE Transactions on Information Theory, vol. 49, Issue 5, pp. 1097-1119, XP011074756, ISSN: 0018-9448, May 2003.
"European Search Report—EP10011743, Search Authority—Munich Patent Office, Dec. 20, 2010".
European Search Report—EP10012081, Search Authority—Munich Patent Office, Dec. 17, 2010.
European Search Report—EP10012082, Search Authority—Munich Patent Office, Dec. 20, 2010.
European Search Report—EP10012083, Search Authority—Munich Patent Office, Dec. 30, 2010.
Guo, K. Et al.: "Providing end-to-end QoS for multimedia applications in 3G wireless networks," Proceedings vol. 5242, SPIE ITCom 2003 Conf. Internet Multimedia Management Systems IV, Nov. 26, 2003, pp. 1-14, DOI: 10.1117/12.514061.
Hochwald, B. et al., "Achieving near-capacity on a multiple-antenna channel," IEEE Transactions on Communications, IEEE Service Center, Piscataway, New Jersey, vol. 51, No. 3, pp. 389-399 (2003).
Kiessling, M. et al., "Short-term and long-term diagonalization of correlated MIMO channels with adaptive modulation" IEEE International Symposium on Personal, Indoor and Mobile Radio Communications, vol. 2, Sep. 15, 2002, pp. 593-597.
Kousa, M. et al: "Adaptive Binary Coding for Diversity Communication Systems" IEEE International Conference on Personal Wireless Communications Proceedings, pp. 80-84, XP000992269, (1997).
Maniatis, I. et al., "Pilots for joint channel estimation in multi-user OFDM mobile radio systems," 2002 IEEE Seventh International Symposium on Spread Spectrum Techniques and Applications, Prague, Czech Republic, Sep. 2, 2002, pp. 44-48, XP010615562.
Nassar et al., "Introduction of Carrier Interference to Spread Spectrum Multiple Access," Wireless Communications and Systems, 1999 Emerging Technologies Symposium, IEEE, Apr. 12-13, 1999, pp. 1-5.
Nokia, "Uplink Considerations for UTRA LTE", 3GPP TSG RAN WG1#40bis, Beijing, CN, R1-050251, 3GPP, Apr. 4, 2005, pp. 1-9.
NTT DoCoMo, "Downlink Multiple Access Scheme for Evolved UTRA", 3GPP R1-050249, 3GPP, Apr. 4, 2005, pp. 1-8.
Prasad, N. et al.: "Analysis of Decision Feedback Detection for MIMO Rayleigh Fading Channels and Optimum Allocation of Transmitter Powers and QAM Constellations," pp. 1-10, 39th Annual Conference on Comm. Control and Comput., Monticello, IL Oct. 2001.
Qualcomm Europe: "Description and link simulations for OFDMA based E-UTRA uplink" 3GPP Draft; R1-051100, 3rd Generation Partnership Project (3GPP), Mobile Competence Centre; Sophia-Antipolis Cedex, France, vol. RAN WG1, No. San Diego, USA; Oct. 4, 2005, pp. 1-10, XP050100715.
S. Nishimura et al., "Downlink Nullforming by a Receiving Antenna Selection for a MIMO/SDMA Channel", Technical Search Report of Electric Information Communication Academic Conference, Feb. 28, 2002, vol. 101, No. 683, pp. 17-22, RCS 2001-286.
Sorger U., et al., "Interleaved FDMA-A New Spread-Spectrum Multiple-Access Scheme, XP010284733," Communications, Conference Record, IEEE, Atlanta, GA, 1998, 1013-1017.
Sumii, Kenji, et al., "A Study on Computational Complexity Reduction of Iterative Decoding for Turbo-coded MIMO-SDM Using Sphere Decoding," Technical Report of IEICE. RCS, Nov. 9, 2010, vol. 104, No. 675, pp. 43-48.
Taiwanese Search Report—095139893—TIPO—Dec. 30, 2010.
Telecommunications Industry Association, "Mobile Station-Base Station Compatibility Standard for Dual-Mode Wideband Spread Spectrum Cellular System," TIA/EIA-95, Jul. 1993.
Tellado, "Multicarrier Modulation with Low Par," Kluwer Academic, Dordrecht, NL, XP-002199500, 2000, pp. 6-11 and 55-60.
Tellambura, "Use of m-sequences for OFDM Peak-to-Average Power Ratio Reduction," Electronics Letters, vol. 33, No. 15, Jul. 17, 1997, pp. 1300-1301.
TIA/EIA/IS-2000 Standards for CDMA2000 Spread Spectrum Systems 3GPP2 C.S0001-0 Version 1.0, Jul. 1999.
Tomcik, T.: "QTDD Performance Report 2," IEEE C802.20-05/88, IEEE 802.20 Working Group on Mobile Broadband Wireless Access, <http://ieee802.org/20/>, pp. 1-56, XP002386798 (Nov. 15, 2005).
Translation of Office Action in Chinese Application 2006800295980 corresponding to U.S. Appl. No. 11/260,895, citing CN1346221 and CN1383631 dated Feb. 16, 2011 .
Translation of Office Action in Japan application 2008-538193 corresponding to U.S. Appl. No. 11/261,065, citing JP11196109, JP10322304 and JP09008725 dated Mar. 8, 2011.
Translation of Office Action in Korean application 10-2007-7031029 corresponding to U.S. Appl. No. 11/260,931, citing US20030202491 and KR20040063057 dated Jan. 28, 2011.
Translation of Office Action in Canadian application 2625987 corresponding to U.S. Appl. No. 11/261,065, citing CA2557369 dated Apr. 12, 2011.
Translation of Office Action in Chinese application 200680040236.1 corresponding to U.S. Appl. No. 11/261,065, citing US20040048609 and CN1402916 dated Feb. 18, 2011.
Translation of Office Action in Chinese application 200680048265.2 corresponding to U.S. Appl. No. 11/260,931, citing US6904097, W02004095851, CN1344451 dated Jan. 26, 2011.
Translation of Office Action in Chinese application 200680048832.4 corresponding to U.S. Appl. No. 11/261,158, citing CN1132474 dated Dec. 31, 2010.

(56) References Cited

OTHER PUBLICATIONS

Translation of Office Action in Japanese Application 2008-514880 corresponding to U.S. Appl. No. 11/445,377, citing JP2007519281 and JP2006505172 dated Nov. 9, 2010.
Translation of Office Action in Japanese application 2008-528103 corresponding to U.S. Appl. No. 11/260,924, citing JP2005502218, JP2004534456, JP2003348047, JP2003199173, JP2004529524, JP11508417, JP2001238269, JP2005130491 and JP2003500909 dated Feb. 8, 2011.
Translation of Office Action in Japanese Application 2008-529216 corresponding to U.S. Appl. No. 11/261,159, citing GB2348776 , WO2004098222, WO2005065062 and WO2004102815.Dated Jan. 11, 2011.
Translation of Office Action in Japanese application 2008-538181 corresponding to U.S. Appl. No. 11/511,735, citing WO04064295, JP2002515203, JP8288927, JP7336323 and JP200157545 dated Jan. 25, 2011.
Voltz, P. J.,"Characterization of the optimum transmitter correlation matrix for MIMO with antenna subset selection", IEEE Transactions on Communications, vol. 51, No. 11, pp. 1779-1782, (Nov. 1, 2003).
Widdup, B. et al., "A highly-parallel VLSI architecture for a list sphere detector," IEEE International Conference, Paris, France, vol. 5, pp. 2720-2725 (2004).
Wiesel, A. et al.: "Efficient implementation of sphere demodulation" Signal Processing Advances in Wireless Communications, 2003. SPAWC 200 3. 4th IEEE Workshop on Rome. Italy June 15-18, 2003, Piscataway, NJ, USA, IEEE, US, Jun. 15, 2003, pp. 36-40, XP010713463.
Xiaodong, et al., "M-Sequences for OFDM Peak-to-Average Power Ratio Reduction and Error Correction," Electronics Letters, vol. 33, Issue 7, Mar. 27, 1997, pp. 554-555.
Yongmei Dai,; Sumei Sun; Zhongding Lei; Yuan Li.: "A List Sphere Decoder based turbo receiver for groupwise space time trellis coded (GSTTC) systems," 2004 IEEE 59th Vehicular Technology Conference, vol. 2, pp. 804-808, May 17, 2004, doi: 10.1109/VETECS. 2004.1388940.
Zekri, et al., "DMT Signals with Low Peak-to-Average Power Ratio," Proceedings, IEEE International Symposium on Computers and Communications, 1999, Jul. 6-8, 1999, pp. 362-368.
Dammann, A. et al., "Beamforming in Combination with Space-Time Diversity for Broadband OFDM Systems", ICC 2002. 2002 IEEE International Conference on Communications. Apr. 28-May 2, 2002, pp. 165-171, XP010589479.
Ken Murakami et al., "Status Toward Standardization at IEEE 802. 3ah and Challenge to System Architecture," Technical Report of the Institute of Electronics, Information and Communication Engineers, Jun. 13, 2003, vol. 103, No. 124, pp. 1-6, IN2003-24.
Sklar, B., "The process of thus correcting the channel-induced distortion is called equalization", Digital Communications, PTR Prentice Hall, Upper Saddle River, New Jersey, 1998, Formatting and Baseband Transmission, Chap. 2, Section 2.11.2, pp. 54,104-106.
Viswanath P et al: "Opportunistic beamforming using dumb antennas" IEEE Transactions on Information Theory IEEE USA, vol. 48, No. 6, Jun. 2002, pp. 1277-1294, XP002314708 ISSN: 0018-9448 abstract right-hand column, paragraph 1.
Alcatel-Lucent, et al., "Dedicated Reference Signals for Precoding in E-UTRA Downlink" 3GPP Draft; R1-071718, 3rd Generation Partnership Project (3GPP), Mobile Competence Centre ; 650, Route Des Lucioles ; F-06921 Sophia-Antipolis Cedex ; France, vol. RAN WG1, No. St. Julian; 20070403, Apr. 3, 2007, XP050105640 [retrieved on Apr. 4, 2007].
Bengtsson, M. et at, "A Generalization of Weighted Subspace Fitting to Full-Rank Models", IEEE Transactions on Signal Processing, IEEE Service Center, New York, NY, US, vol. 49, No. 5, pp. 1002-1012, May 1, 2001.
European Search Report—EP10184156—Search Authority—Munich—Jun. 14, 2012.
Miorandi D., et al., "Analysis of master-slave protocols for real-time industrial communications over IEEE 802.11 WLANs" Industrial Informatics, 2004. INDIN '04, 2nd IEEE International Conference on Berlin, Germany Jun. 24-26, 2004. Piscataway, NJ, USA IEEE, June 24, 2004, pp. 143-148, XP010782619, ISBN 0789385136, Para 3, point B.
Physical Channels and Multiplexing in Evolved UTRA Downlink TSG-RAN Working Group 1 Meeting, XX, XX, vol. RI-050590, Jun. 20, 2005, pp. 1-24, XP003006923 the whole document.
Siemens, "Evolved UTRA uplink scheduling and frequency reuse" [online], 3GPP TSG-RAN WG1 # 41 R1-050476, Internet <URL:http://www.3gpp.org/ftp/tsg_ran/WG1_RL1/TSGR1_41/Docs/R1-050476.zip>, May 9, 2005.
Yatawatta, S. et al., "Energy Efficient Channel Estimation in MIMO Systems", 2005 IEEE International Conference on Acoustics, Speech, and Signal Processing, Mar. 18-23, 2005, Philadelphia, vol. 4, pp. 317-320, Mar. 18, 2005.
Anonymous: "3GPP TS 36.211 V8.0.0; Evolved Universal Terrestrial Radio Access (E-UTRA); Physical channels and modulation (Release 8)" 3rd Generation Partnership Project; Technical Specification Group Radio Access Network, [Online] 2007, XP002520076 Retrieved from the Internet: URL:http://www.Sgpp.org/ftp/Specs/html-i nf o/36211.htm> [retrieved on Sep. 9, 2007] Section 5.
Jim Tomcik, QFDD and QTDD: Technology Overview, IEEE 802.20 Working Group on Mobile Broadband Wireless Access, Oct. 28, 2005, pp. 48-50, URL, http://www.ieee802.org/20/contribs/c802.20-05-68.zip.
Nokia: "Compact signalling of multi-code allocation for HSDPA", version 2,3GPP R1-02-0018, Jan. 11, 2002.
Sethi M, et al., "Code Reuse DS-CDMA—A Space Time Approach", Proceedings of the 2002 IEEE International Conference on Acoustics, Speech, and Signal Processing (ICASSP), pp. 2297-2300, May 13-17, 2002.
Bhushan N., "UHDR Overview", C30-20060522-037, Denver, CO, May 22, 2006, pp. 1-115.
Samsung: "Uplink Transmission and Multiplexing for EUTRA", 3GPP Draft; R1-050605 UL Multiplexing, Jun. 16, 2005, XP050111420.
Tachikawa (Editor); "W-CDMA Mobile Communication Systems," John Wiley & Sons Ltd., Japan, Maruzen: pp. 82-213, Jun. 25, 2001.
LG Electronics: "PAPR comparison of uplink MA schemes", 3GPP TSG RAN WG1 Meeting #41, R1-050475, May, 9-13, 2005, pp. 6.
Motorola,"Uplink Numerology and Frame Structure", 3GPP TAG RAN1 #41 Meeting R1-050397, May 13, 2005.
Samsung Electonics Co. Ltd.; "Uplink Multiple Access and Multiplexing for Evolved UTRA", R1-050439, May 3, 2005, pp. 1-22, XP55018616, Retrieved from the Internet: URL:http://www.3gpp.org/ftp/tsg_ran/WG1_R1/TSGR1/DOCS/[retrieved on Feb. 7, 2012].
Tomcik J., "QFDD and QTDD: Proposed Draft Air Interface Specification," IEEE C802.20-05/69, IEEE 802.20 Working Group on Mobile Broadband Wireless Access, Oct. 28, 2005, P. 1-6,1-7,1-16,6-65,7-11,7-33,7-37-7-55,9-21,9-22,9-24-9-32.
Digital cellular telecommunications system (Phase 2+); General Packet Radio Service (GPRS); Mobile Station (MS)-Base Station System (BSS)interface; Radio Link Control/Medium Access Control (RLC/MAC) protocol (GSM 04.60 version 8.4.1 Release 1999), 3GPP Standard; ETSI EN 301 349, 3rd Generation Partnership Project (3GPP), Mobile Competence Centre; 650, Route Des Lucioles; F-06921 Sophia-Antipolis Cedex; France, No. V8.4.1, Oct. 1, 2000, pp. 1-243, XP050358534.
Institute for Infocomm Research et al., "Intra-Node B Macro Diversity based on Cyclic Delay Transmissions", 3GPP TSG RAN WG1 #42 on LTE, R1-050795, Aug. 29-Sep. 2, 2005, pp. 1-5.
Sommer D., et al., "Coherent OFDM transmission at 60 GHz", Vehicular Technology Conference, 1999, VTC 1999—Fall, IEEE VTS 50th Amsterdam, Netherlands Sep. 19-22, 1999, Piscataway, NJ, USA, IEEE, US, vol. 3, Sep. 19, 1999, pp. 1545-1549, XP010353233, DOI: 10.1109/VETECF.1999.801553, ISBN: 978-0-7803-5435-7.
Zhang H., "A new space-time-frequency MIMO-OFDM scheme with cyclic delay diversity", Frontiers of Mobile and Wireless Communication, 2004. Proceedings of the IEEE 6th Circuits and Systems Symposium on vol. 2, Jun. 2, 2004, pp. 647 to 650.

* cited by examiner

400

SEGMENT SENSITIVE SCHEDULING

CLAIM OF PRIORITY UNDER 35 U.S.C. §120

The present application for patent is a divisional of patent application Ser. No. 11/260,924 entitled "CHANNEL SENSITIVE SCHEDULING" filed Oct. 27, 2005, assigned to the assignee hereof and hereby expressly incorporated by reference herein, and claims priority to Provisional Application No. 60/710,461 entitled "CHANNEL SENSITIVE SCHEDULING" filed Aug. 22, 2005.

The present application for patent is related to the following co-pending U.S. patent applications:

"Shared Signaling Channel" by having Ser. No. 11/261,158, filed concurrently herewith, assigned to the assignee hereof, and expressly incorporated by reference herein; and "Mobile Wireless Access System" having Ser. No. 60/731,013, filed concurrently herewith, assigned to the assignee hereof, and expressly incorporated by reference herein.

BACKGROUND OF THE INVENTION

1. Field of the Disclosure

The disclosure relates to the field of wireless communications. More particularly, the disclosure relates to scheduling of resources in a wireless communication system.

2. Description of Related Art

Communication devices operating in wireless communication systems can be affected by drastic changes in the channel conditions experienced by communication device. The channel conditions can be affected by extraneous interferers and can be affected by changes in the physical relationship and terrain separating a wireless transmitter from a receiver.

It is known that a wireless signal originating at the transmitter is attenuated by the physical distance to the receiver. Additionally, it is known that multipath signals from the transmitter to the receiver can result in fading of the channel.

A wireless communication system can compensate for attenuation by increasing transmit power or by increasing modulation or coding gain associated with the transmit signal. A wireless communication system may partially compensate for multipath fading by implementing a broadband signal that allows the receiver to separately identify multipath signals.

A wireless communication system implementing frequency division multiplexing can operate over a relatively wide frequency band. The operating band may be sufficiently wide that distinct communication devices operating at the same location but at different operating frequencies may experience substantially different channel conditions and channel fading. Additionally, each communication device may not operate with a sufficiently broad band signal to allow the device to compensate for multipath fades.

It is desirable to have the ability to communicate in a frequency division multiplex communication system with multiple communication devices in a manner that compensates for, or otherwise substantially eliminates the effects of frequency selective channel conditions.

BRIEF SUMMARY OF THE INVENTION

Systems and methods of scheduling sub-carriers in an OFDMA system are disclosed, in which a scheduler takes into account channel conditions experienced by the communication devices to optimize channel conditions. The scheduler can partition a set of sub-carriers spanning an operating bandwidth into a plurality of segments. The segments can include a plurality of global segments that each includes a distinct non-contiguous subset of the sub-carriers spanning substantially the entire operating bandwidth. One or more of the global segments can be further partitioned into a plurality of local segments that each has a bandwidth that is less than a channel, carrier, or coherence bandwidth. The scheduler determines channel characteristics experienced by each communication device via reporting or channel estimation, and allocates one or more segments to communication links for each device according to the segment characteristics.

The disclosure includes a method of segment sensitive scheduling in an Orthogonal Frequency Division Multiple Access (OFDMA) communication system including a plurality of sub-carriers spanning an operating frequency band. The method includes partitioning the operating frequency band into a plurality of segments, determining a segment preference indicative of a preferred segment based upon channel characteristics experienced by a receiver, and assigning a subset of sub-carriers within the preferred segment to a particular communication link associated with the segment preference.

The disclosure includes a method of segment sensitive scheduling that includes partitioning the operating frequency band into a plurality of segments, determining user data constraints, assigning sub-carriers from a global segment having a non-contiguous subset of sub-carriers spanning a substantial fraction of the operating band if the user data constraints include a data bandwidth requirement greater than a coherent bandwidth of a carrier, segment, or the like determining, if the data bandwidth requirement is not greater than the coherent bandwidth of a carrier, segment or the like, a segment preference indicative of a preferred local segment based upon channel characteristics experienced by a receiver, the preferred local segment selected from a plurality of local segments, each of the plurality of local segments having a bandwidth less than the coherent bandwidth, and assigning a subset of sub-carriers within the preferred local segment to a communication link associated with the segment preference.

The disclosure includes an apparatus for segment sensitive scheduling. The apparatus includes a receiver module configured to receive a pilot signal, a channel estimator coupled to the receiver and configured to determine a channel estimate corresponding to each of a plurality of segments spanning the operating frequency band based on the pilot signal, each of the segments having a bandwidth less than a coherent bandwidth, a signal mapper configured to map serial data symbols to a subset of the plurality of sub-carriers in the OFDMA communication system, and a resource scheduler coupled to the channel estimator and configured to determine a first preferred segment based on the channel estimates, select the subset of the plurality of sub-carriers from within the first preferred segment, and further configured to control the signal mapper to map the data symbols to the subset of the plurality of sub-carriers.

The disclosure includes an apparatus for segment sensitive scheduling that includes a receiver module configured to receive a reverse link pilot signal and at least one channel characteristic reporting message, and a scheduler coupled to the receiver module and configured to determine, based on the reverse link pilot signal, a channel characteristic corresponding to each of a plurality of segments spanning the operating frequency band, each of the segments having a bandwidth less than a coherent bandwidth, the scheduler configured to determine a reverse link assignment based on the channel characteristics and further configured to determine a forward link resource assignment based on the at least one channel characteristic reporting message.

The disclosure includes an apparatus for segment sensitive scheduling that includes means for determining a segment preference indicative of a preferred segment from a plurality of segments substantially spanning the operating band based upon channel characteristics experienced by a receiver, and means for assigning a subset of sub-carriers within the preferred segment to a particular communication link associated with the segment preference.

The disclosure includes a method of reporting segment characteristics. The method includes receiving a pilot signal, determining a segment characteristic corresponding to each of a plurality of segments spanning the operating band, each segment having a bandwidth less than a coherent bandwidth, determining a preferred segment from the plurality of segments, comparing the channel characteristic corresponding to the preferred segment to a reporting threshold, and generating a reporting message based on the preferred segment if the channel characteristic corresponding to the preferred segment exceeds the reporting threshold.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF THE INVENTION

Figure 1:
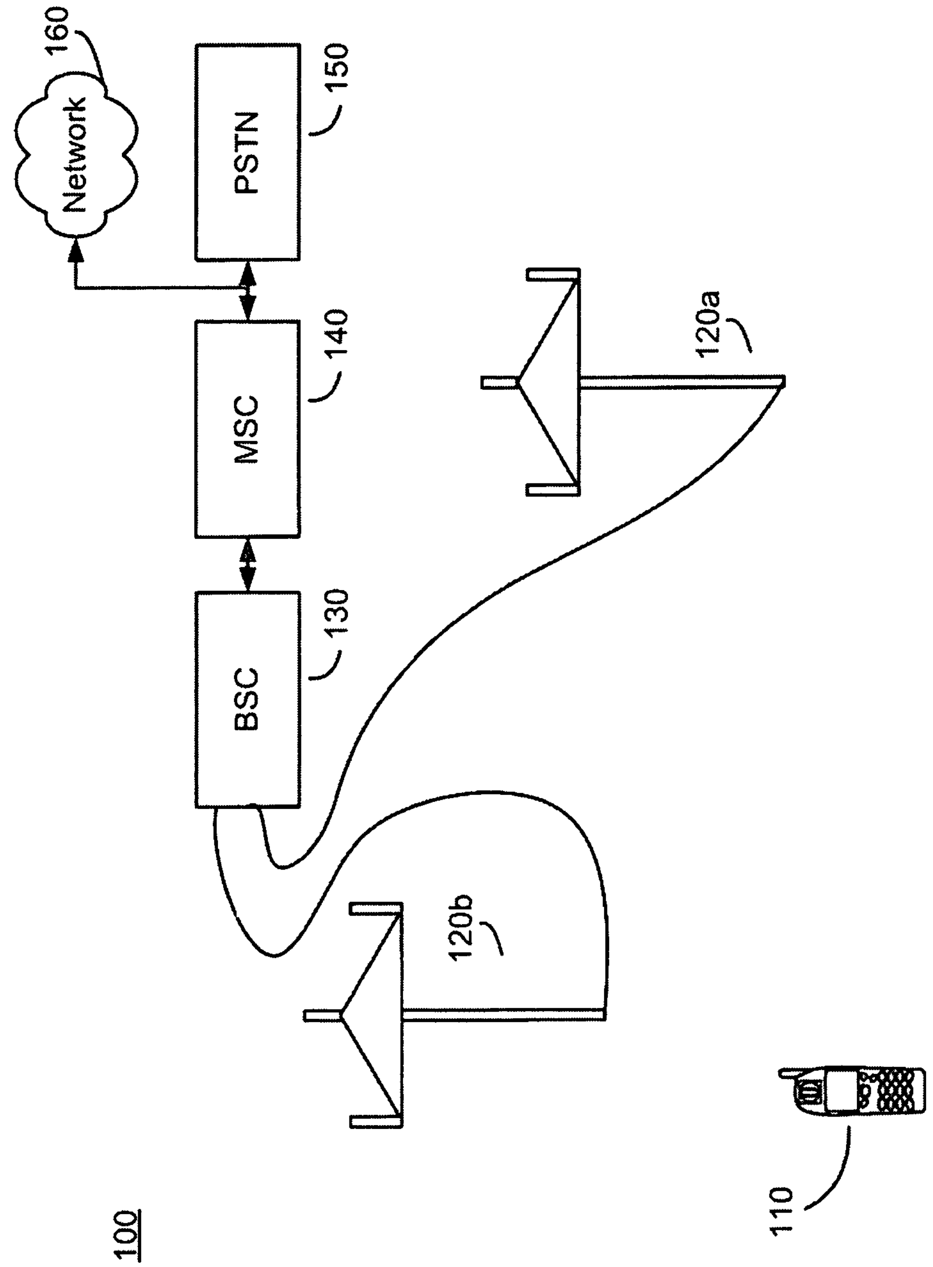
FIG. 1 is a simplified functional block diagram of an embodiment of a communication system having segment sensitive scheduling.

Segment sensitive scheduling of sub-carrier resources in an Orthogonal Frequency Division Multiple Access (OFDMA) communication system provides for a form of multi-user frequency diversity. A segment sensitive scheduler operates to schedule communication links with communication devices on available sub-carriers in the OFDMA system having maximum gain.

Frequency selectivity is a common characteristic of broadband wireless communication systems. Users with the same average channel strength may have quite different channel strength at particular frequency tones. The interference a user observes is in general also frequency selective. Hence, it would be desirable for users to communicate over the frequency tones with high signal level or low interference level depending on user data requirements and information resources of the system. The segment sensitive scheduling schemes discussed herein implement scheduling frequency tones, such as sub-carriers in an OFDMA system, based on the user frequency or channel characteristics under overhead and latency constraints.

One set of beneficiaries of segment sensitive scheduling include users with low signal to noise ratio (SNR), limited assignment size and low mobility. According to information theory, SNR improvement translates into capacity gain through a logarithmic function, hence, the capacity gain is larger if the SNR is low. In practical systems, the capacity of high SNR users may also be limited by the capacity of the highest order modulation and coding scheme that saturates at certain SNR, which diminishes the improvements due to further improvement in SNR. High data rate users require transmission of signals over a large fraction of the total bandwidth, which reduces the potential gain of scheduled transmission over average segment SNR. The scheduling and transmission delay can make it difficult to schedule high mobility users on their preferred tones based on past channel observations. Fortunately, many users in a wide area network satisfy the SNR, assignment size, and mobility requirements to benefit from segment sensitive scheduling.

A scheduler in an OFDMA system can be configured to schedule forward link communications from a base station to a user terminal, reverse link communications from a user terminal to a base station, or a combination of forward link and reverse link communications. A scheduler can perform forward link scheduling independent of reverse link scheduling. In other embodiments, the scheduler can relate forward link scheduling to reverse link scheduling.

The scheduler operates to schedule channel resources based, at least in part, on channel characteristics experienced by the communication devices. In one embodiment, the scheduler can determine the channel characteristics based on one or more channel quality indicator (CQI) included in one or more reporting messages communicated from a communication device to the scheduler. In another embodiment, the scheduler can be configured to determine the channel characteristics through channel estimation. In another embodiment, the scheduler can determine the channel characteristics using a combination of reporting messages and channel estimation.

FIG. 1 is a simplified functional block diagram of an embodiment of a wireless communication system 100 configured to schedule resources based on channel characteristics. The system 100 includes one or more fixed elements that can be in communication with a user terminal 110. Although the description of the system 100 of FIG. 1 generally describes a wireless telephone system or a wireless data communication system, the system 100 is not limited to implementation as a wireless telephone system or a wireless data communication system nor is the system 100 limited to having the particular elements shown in FIG. 1.

The user terminal 110 can be, for example, a wireless telephone configured to operate according to one or more communication standards. The user terminal 110 can be a portable unit, a mobile unit, or, a stationary unit. The user terminal 110 may also be referred to as a mobile unit, a mobile terminal, a mobile station, user equipment, a portable, a phone, and the like. Although only a single user terminal 110 is shown in FIG. 1, it is understood that a typical wireless communication system 100 has the ability to communicate with multiple user terminals 110.

The user terminal 110 typically communicates with one or more base stations 120*a* or 120*b*, here depicted as sectored cellular towers. Other embodiments of the system 100 may include access points in place of the base stations 120*a* and 120*b*. In such a system 100 embodiment, the BSC 130 and MSC 140 may be omitted and may be replaced with one or more switches, hubs, or routers.

As used herein, a base station may be a fixed station used for communicating with the terminals and may also be referred to as, and include some or all the functionality of, an access point, a Node B, or some other terminology. An access terminal may also be referred to as, and include some or all the functionality of, a user equipment (UE), a wireless communication device, terminal, a mobile station or some other terminology.

The user terminal 110 will typically communicate with the base station, for example 120*b*, that provides the strongest signal strength at a receiver within the user terminal 110. Each of the base stations 120*a* and 120*b* can include a scheduler configured to assign and schedule the segment resources. The one or more base stations 120*a*-120*b* can be configured to schedule the channel resources used in the forward link, reverse link, or both links.

Each of the base stations 120*a* and 120*b* can be coupled to a Base Station Controller (BSC) 140 that routes the communication signals to and from the appropriate base stations 120*a* and 120*b*. The BSC 140 is coupled to a Mobile Switching Center (MSC) 150 that can be configured to operate as an interface between the user terminal 110 and a Public Switched Telephone Network (PSTN) 150. In another embodiment, the system 100 can implement a Packet Data Serving Node (PDSN) in place or in addition to the PSTN 150. The PDSN can operate to interface a packet switched network, such as network 160, with the wireless portion of the system 100.

The MSC 150 can also be configured to operate as an interface between the user terminal 110 and a network 160. The network 160 can be, for example, a Local Area Network (LAN) or a Wide Area Network (WAN). In one embodiment, the network 160 includes the Internet. Therefore, the MSC 150 is coupled to the PSTN 150 and network 160. The MSC 150 can also be configured to coordinate inter-system handoffs with other communication systems (not shown).

The wireless communication system 100 can be configured as an OFDMA system with communications in both the forward link and reverse link utilizing OFDM communications. The term forward link refers to the communication link from the base stations 120*a* or 120*b* to the user terminal 110, and the term reverse link refers to the communication link from the user terminal 110 to the base stations 120*a* or 120*b*. Both the base stations 120*a* and 120*b* and the user terminal 110 may allocate resources for channel and interference estimation. For example, both the base stations 120*a* and 120*b* and the user terminal 110 may broadcast pilot signals that are used be the corresponding receivers for channel and interference estimation.

The wireless communication system 100 can include a set of sub-carriers that span an operating bandwidth of the OFDMA system. Typically, the sub-carriers are equally spaced. The wireless communication system 100 may allocate one or more sub-carriers as guard bands, and the system 100 may not utilize the sub-carriers within the guard bands for communications with the user terminal 110.

In one embodiment, the wireless communication system 100 can include 2048 sub-carriers spanning an operating frequency band of 20 MHz. A guard band having a bandwidth substantially equal to the bandwidth occupied by six sub-carriers can be allocated on each end of the operating band. Therefore, in this embodiment, over 2000 sub-carriers are available for allocation to communications with the user terminal 110.

The wireless communication system 100 can be configured to partition the operating band into a plurality of operating segments, each of which can include at least one sub-carrier. The wireless communication system 100 can partition the forward link and reverse links to be identical. Alternatively, the forward link and reverse link segment definitions can be distinct.

The segments can each have a distinct set of sub-carriers, such that no sub-carrier is allocated to more than one segment. In another embodiment, segments may have overlapping sub-carrier assignments. The segments can be contiguous frequency bands within the operating band or can be non-contiguous bands within the operating band. In one embodiment, each segment can span at least 16 sub-carriers or a multiple of 16 sub-carriers, although not all of the sub-carriers may be allocated to the same segment. Additionally, the segments may not be equally sized, and segments nearer the edge of the operating band may be smaller than segments closer to the center of the operating band.

In one embodiment, the wireless communication system 100 can be configure to partition a plurality of global segments, where each global segment has a bandwidth that spans a substantial fraction of the total operating band. Each of the global segments typically includes a non-contiguous subset of the total set of sub-carriers. In one embodiment, two global segments may be defined, with odd sub-carriers allocated to a first global segment and even sub-carriers allocated to a second global segment. In another embodiment, three global segments can be defined, with each global segment assigned every third sub-carrier in the operating band. Of course, the global segments do not need to have equally spaced sub-carriers, and do not need to span substantially the entire operating band. For example, two global segments can be defined that span one-half of the operating band, with sub-carriers in the half of the operating band alternately assigned to the global segments. Various other segment partitions may be defined, and the disclosure is not limited to any particular segment partition.

The wireless communication system 100 can also be configured to partition the operating band into one or more local segments. In one embodiment, each of the local segments can include a contiguous subset of all of the sub-carriers in the operating band. In another embodiment, at least one local segment can include a non-contiguous subset of sub-carriers. In one embodiment, each of the sub-carriers in the local segment can be within a coherent bandwidth of any other sub-carrier assigned to the same local segment. The coherent bandwidth corresponds to the bandwidth in which no substantial frequency selective fading occurs relative to another frequency within the band. For example, an embodiment can partition the operating band into multiple segments each having a bandwidth of approximately 1.25 MHz.

For example, the International Telecommunication Union (ITU) defines a channel model designated the Ped-B channel. This channel model has a coherent bandwidth on the order of hundreds of kilohertz. Thus, a local segment can have a bandwidth that is less than the coherent bandwidth of the Ped-B channel model. With such a local segment constraint, the resource assignments within any particular local segment are relatively frequency non-selective. That is, a channel estimate within one local segment can be valid for any combination of sub-carriers within the local segment. For example, a wireless communication system 100 with an operating bandwidth of 20 MHz can partition the band into local segments of approximately 1.25 MHz each.

In one embodiment, the operating band can be partitioned into a predetermined number of local segments, each having substantially equal number of contiguous sub-carriers. In another embodiment, the wireless communication system 100 can include both global and local segments. For example, the wireless communication system 100 can define two global segments, with sub-carriers alternately assigned to each of the global segments. The wireless communication system 100 can select one of the global segments and can further partition the selected global segment into a plurality of local segments.

The wireless communication system 100 can include one more schedulers that are configured to allocate sub-carrier resource assignments to the various communication links within the system. For example, the wireless communication system 100 can include one or more schedulers at each of the base stations 120*a* and 120*b*. In one embodiment, each of the base stations 120*a* and 120*b* can include a first scheduler configured to schedule forward link sub-carrier assignments within the coverage area and a second scheduler configured to schedule reverse link sub-carrier assignments within the coverage area. Because each individual user terminal 110 typically has no knowledge regarding the sub-carrier assignments of other user terminals 110 within a particular coverage area, it may be advantageous for the wireless communication system 100 to implement a centralized reverse link scheduler for each coverage area located at the base stations 120*a* and 120*b*.

The scheduler can be configured to determine a resource assignment, including sub-carriers and corresponding segments, based in part on the channel characteristics experienced by the communication device. For example, the forward link scheduler can be configured to assign sub-carriers and segments based on the channel characteristics experienced by the base station, for example 120*a*, when communicating with a particular user terminal 110. Similarly, the reverse link scheduler can be configured to adding sub-carriers and segments to each user terminal 10 based in part on the channel characteristics experienced by the reverse link signal.

The schedulers can determine the channel characteristics on the forward and reverse links based on channel analysis, channel characteristic reporting, or a combination of channel analysis and reporting. The schedulers can be configured to assign the sub-carriers and segments to a communication link that exhibit the greatest signal level or that have the lowest interference. The scheduler can determine the number of sub-carriers assigned to a particular communication link based on a variety of factors, including the bandwidth of the signal communicated. The scheduler can also take into account other scheduling criteria, such as fairness, signal latency constraints, and other criteria, when assigning segments and sub-carriers to a communication link.

The wireless communication system 100 can maintain some level of interference diversity between the various communication channels by implementing frequency hopping. A communication link, such as a forward link signal transmitted by a base station 120*a* or 120*b*, or a reverse link signal transmitted by a user terminal 110, can be configured to frequency hop across a plurality of sub-carriers based on an initial sub-carrier assignment and a predetermined frequency hopping algorithm. The wireless communication system 100 can implement a frequency hopping algorithm that enforces frequency hopping within the assigned segments. Therefore, a forward link signal that is assigned a subset of carriers within a segment will perform frequency hopping within the segment in order to provide some level of interference diversity.

The wireless communication system 100 can be configured to Frequency Division Duplex (FDD) the forward and reverse links. In a FDD embodiment, the forward link is frequency offset from the reverse link. Therefore, forward link sub-carriers are frequency offset from the reverse link sub-carriers. Typically, the frequency offset is fixed, such that the forward link channels are separated from the reverse link sub-carriers by a predetermined frequency offset. The forward link and reverse link may communicate simultaneously, or concurrently, using FDD. In an FDD system, channel estimates determined for the forward or reverse link signals are typically not accurate channel estimates for the complementary FDD reverse or forward link channels. Thus in FDD systems, channel characteristic reporting may be used to communicate channel characteristics to the appropriate scheduler.

In another embodiment, the wireless communication system 100 can be configured to Time Division Duplex (TDD) the forward and reverse links. In such an embodiment, the forward link and reverse links can share the same sub-carriers, and the wireless communication system 100 can alternate between forward and reverse link communications over predetermined time intervals. In TDD, the allocated frequency channels are identical between the forward and reverse links, but the times allocated to the forward and reverse links are distinct. A channel estimate performed on a forward or reverse link channel is typically accurate for the complementary reverse or forward link channel because of reciprocity.

The base stations, 120*a* and 120*b*, and the user terminal 110 can be configured to broadcast a pilot signal for purposes of channel and interference estimation. The pilot signal can include broadband pilots such as a plurality of CDMA waveforms or a collection of narrow band pilots that span the overall spectrum. The broadband pilots could also be a collection of narrow band pilots staggered in time and frequency.

In one embodiment, the pilot signal can include a number of tones selected from the OFDM frequency set. For example, the pilot signal can be formed from uniformly spaced tones selected from the OFDM frequency set. The uniformly spaced configuration may be referred to as a staggered pilot signal.

The scheduler in the base station, 120*a* or 120*b*, can determine the channel characteristics in each of the segments based on the pilot signals. The recipient of the pilot signal, for example the user terminal 110 in the forward link direction, can determine an estimate of the channel and interference based on the received pilot signal. Additionally, the user terminal 110 can determine an estimate of the signal quality of the received signal, such as by determining a received signal to noise ratio (SNR). The signal quality of the received signal can be quantified as a channel quality indicator (CQI) value, which can be determined, in part based on the estimated channel and interference. In a wireless communication system 100 implementing multiple operating segments, the user terminal 110 can determine a channel and interference estimate corresponding to each of the operating segments and determine one or more CQI values based on the various channel and interference estimates.

The user terminal 110 can report a CQI value back to the base station, for example 120*a*, and a scheduler in the base station 120*a* can compare the CQI value for each of the operating segments to determine the segment(s) to allocate to the user terminal 110. The user terminal 110 can report the CQI directly in a reporting message or can generate a reporting message that includes data and information derived from the CQI value. For example, the user terminal 110 can be configured to determine the segment having the greatest CQI value and report the CQI value and identity of the corresponding segment. As will be discussed in greater detail below, the user terminal 110 can be configured to report the CQI value or related reporting message regularly, on an assigned basis, or on a probabilistically determined basis.

The wireless communication system 100 can implement a retransmission process, such as a Hybrid Automatic Repeat Request (HARQ) algorithm. In such a system, a transmitter may send an initial transmission at a first data rate and may send a subsequent retransmissions due to unsuccessful receipt at lower rates. HARQ incremental redundancy retransmission schemes can improve system performance in terms of providing early termination gain and robustness. However, improvements attributable to segment sensitive scheduling can be reduced if the scheduled transmission is based on out-dated information, which may occur in HARQ systems. If the segments and sub-carriers are not reallocated for retransmissions of an HARQ protocol, the segment which has high SNR at the time of the first transmission may get faded and results in a loss in performance.

Thus, in one embodiment, the wireless communication system 100 can be configured to re-determine the channel characteristics and can re-schedule sub-carrier and segments assigned to a particular communication link for HARQ retransmissions. Alternatively, the probability of channel fade occurring in the duration of the longest retransmission duration of a HARQ protocol, and the probability of a HARQ re-transmission occurring during channel fade may be sufficiently low. In such a situation, the wireless communication system may not reschedule sub-carriers and segments for HARQ retransmissions and may allow the communication link to experience a slight degradation if a channel fade should occur during the HARQ retransmissions.

Figure 2:
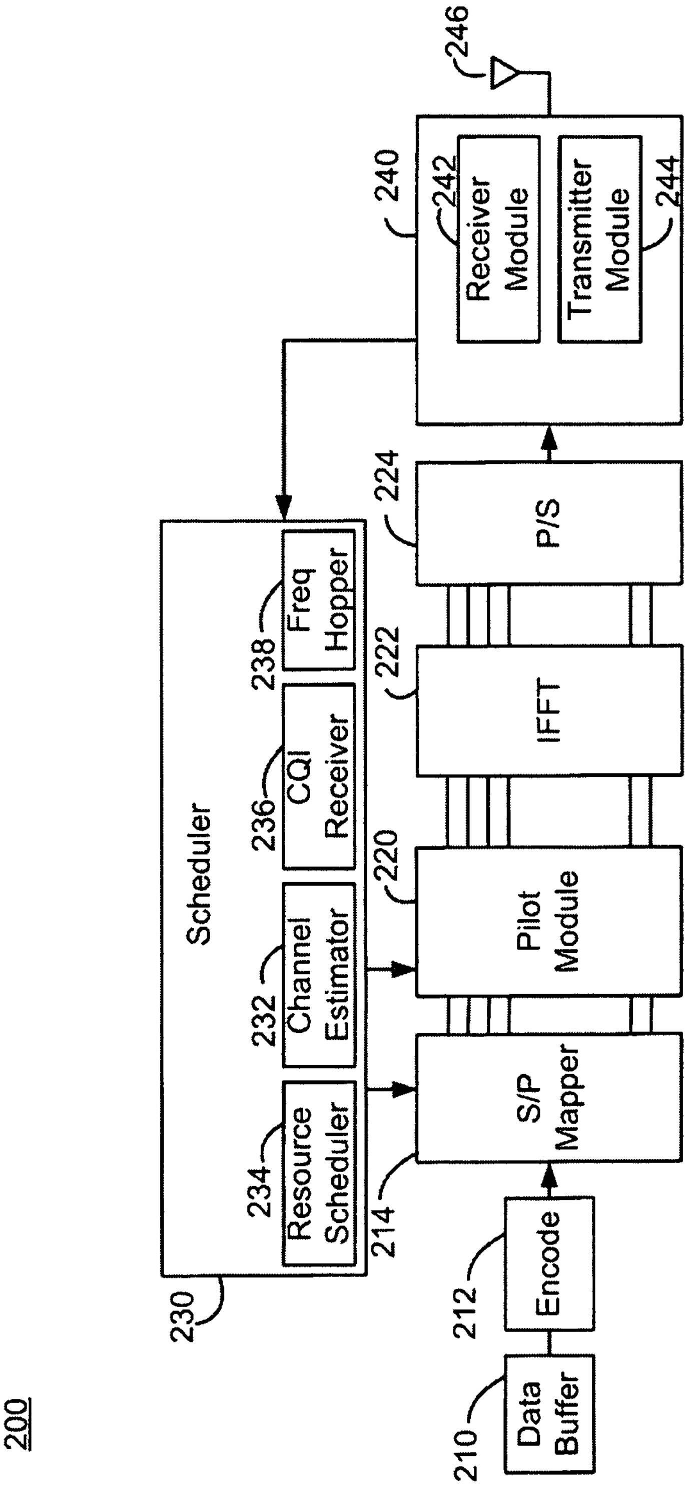
FIG. 2 is a simplified functional block diagram of an embodiment of a transmitter with segment sensitive scheduling.

FIG. 2 is a simplified functional block diagram of an embodiment of an OFDMA transmitter 200 such as can be incorporated within a base station of the wireless communication system of FIG. 1. The following discussion describes an embodiment in which the transmitter 200 is implemented in a base station of a wireless communication system configured for OFDMA communications. The transmitter 200 is configured to transmit one or more OFDMA signals to one or more user terminals. The transmitter 200 includes a data buffer 210 configured to store data destined for one or more receivers. The data buffer 210 can be configured, for example, to hold the data destined for each of the user terminals in a coverage area supported by the corresponding base station.

The data can be, for example, raw unencoded data or encoded data. Typically, the data stored in the data buffer 210 is unencoded, and is coupled to an encoder 212 where it is encoded according to a desired encoding rate. The encoder 212 can include encoding for error detection and Forward Error Correction (FEC). The data in the data buffer 210 can be encoded according to one or more encoding algorithms. Each of the encoding algorithms and resultant coding rates can be associated with a particular data format of a multiple format Hybrid Automatic Repeat Request (HARQ) system. The encoding can include, but is not limited to, convolutional coding, block coding, interleaving, direct sequence spreading, cyclic redundancy coding, and the like, or some other coding.

A wireless communication system implementing a HARQ algorithm can be configured to retransmit prior data that was not successfully decoded. The HARQ algorithm can be configured to provide a maximum number or retransmissions, and each of the retransmissions can occur at a lower rate. In other embodiments, the HARQ algorithm can be configured to transmit some of the retransmissions at the same rate.

The encoded data to be transmitted is coupled to a serial to parallel converter and signal mapper 214 that is configured to convert a serial data stream from the encoder 212 to a plurality of data streams in parallel. The scheduler 230 determines the number of sub-carriers, the identity of the sub-carriers, and the corresponding frequency segments for each user terminal. The scheduler 230 provides the resource allocation information to the signal mapper 214. The number of carriers allocated to any particular user terminal may be a subset of all available carriers. Therefore, the signal mapper 214 maps data destined for a particular user terminal to those parallel data streams corresponding to the data carriers allocated to that user terminal by the scheduler 230.

The output of the serial to parallel converter/signal mapper 214 is coupled to a pilot module 220 that is configured to allocate a predetermined portion of the sub-carriers to a pilot signal. In one embodiment, the pilot signal can include a plurality of equally spaced sub-carriers spanning substantially the entire operating band. The pilot module 220 can be configured to modulate each of the carriers of the OFDMA system with a corresponding data or pilot signal.

The output of the pilot module 220 is coupled to an Inverse Fast Fourier Transform (IFFT) module 222. The IFFT module 222 is configured to transform the OFDMA carriers to corresponding time domain symbols. Of course, a Fast Fourier Transform (FFT) implementation is not a requirement, and a Discrete Fourier Transform (DFT) or some other type of transform can be used to generate the time domain symbols. The output of the IFFT module 222 is coupled to a parallel to serial converter 224 that is configured to convert the parallel time domain symbols to a serial stream.

The serial OFDMA symbol stream is coupled from the parallel to serial converter 224 to a transceiver 240. In the embodiment shown in FIG. 2, the transceiver 240 is a base station transceiver configured to transmit the forward link signals and receive reverse link signals.

The transceiver 240 includes a forward link transmitter module 244 that is configured to convert the serial symbol stream to an analog signal at an appropriate frequency for broadcast to user terminals via an antenna 246. The transceiver 240 can also include a reverse link receiver module 242 that is coupled to the antenna 246 and is configured to receive the signals transmitted by one or more remote user terminals.

The scheduler 230 can be configured to receive reverse link signals, including the reverse link pilot signals and channel characteristic reporting messages, and determine the segments and sub-carriers to assign to the communication links for each of the user terminals. As described earlier, the scheduler 230 can use the reverse link pilot signals to determine the reverse link resource allocation. Additionally, the scheduler 230 can use the reverse link pilot signals to determine forward link resource allocation for TDD systems in which OFDMA system uses the same bandwidth for the forward and reverse links. In the embodiment shown in FIG. 2, the scheduler 230 can be used to schedule both forward and reverse link resources. In other embodiments, a separate scheduler can be used for the forward and reverse links.

The reverse link receiver module 242 can couple the reverse pilot signals to a channel estimator 232, shown in this embodiment as part of the scheduler 230. Of course, the channel estimator 232 is not limited to implementation within the scheduler 230 and may be implemented in some other module, such as the reverse link receiver 242. The channel estimator 232 can determine, for each of the user terminals broadcasting a reverse pilot signal, which segment has the highest signal power or highest Signal to Noise Ratio (SNR). Additionally, the channel estimator 232 can determine which of the segments has the lowest interference level.

High bandwidth communication links that are assigned to the global segments may not experience a significant improvement when the sub-carrier assignments over a resource allocation scheme that allocates resources based on highest average channel strength. Thus, in one embodiment, the channel estimator 232 determines the channel characteristics for each local segment and does not determine the channel characteristics for the global segments. Alternatively, the channel estimator 232 can be configured to determine an average channel strength for the global segments.

The channel estimator 232 can communicate the channel characteristic information to the resource scheduler 234 that operates to schedule the sub-carriers to the appropriate forward links based on the channel characteristic information. The resource scheduler 234 can also include reverse link scheduling messages on one or more overhead channels in the OFDMA system.

In one embodiment, the wireless communication system can implement an assignment algorithm that minimizes the overhead associated with resource assignments. The assignment method can be referred to as "sticky assignment." The assignment algorithm may alternatively be referred to as persistent assignment or enduring assignment. In sticky assignment a user's assignment does not expire unless an explicit de-assignment message is received. An assignment message to other users that include a user's current resource ID is considered as a de-assignment message of the corresponding resource of this user. A user is assigned certain segment corresponding to a particular frequency band based upon favorable channel characteristics. This user will keep receiving or sending information over sub-carriers within the segment until a new assignment is received. Given limited scheduling overhead of N simultaneous messages, the system can potentially simultaneously schedule M users, where M is much greater than N.

Once resources are allocated to a particular communication link, the communication link can continue with that assignment. However, the sub-carrier assignments are not necessarily static. For example, the resource scheduler 234 can implement a channel tree that is a logical map of the available resources. The resources scheduler 234 can be configured to assign resources based on the logical structure of the channel tree. The resource scheduler 234 or some other module, such as the frequency hopping module 238, can map the logical resource assignment from the channel tree to a physical assignment that corresponds to physical sub-carriers of the OFDM system.

The channel tree can be organized in a branch structure with multiple branches. The branches eventually terminate in a lowest level of the tree, referred to as a leaf node or a base node. Every branch node in the channel tree can be assigned an identifying node index. Additionally, each leaf node or base node can be assigned a node index. Typically, the number of leaf nodes can correspond to the number of physical sub-carriers available in the OFDM system.

Every node includes a corresponding node index, and higher level branch nodes can be used to identify all of the nodes underneath the branch node in the channel tree. Thus, assigning a particular branch node to a particular communication link assigns all of the leaf nodes appearing underneath the particular branch node to that communication link.

Although each node of the channel tree, including each leaf node or base node, can be arbitrarily mapped to any physical resource, it may be advantageous to provide some mapping constraints on the channel tree. For example, the leaf nodes can be divided into groups, where each group of leaf nodes corresponds approximately to the number of sub-carriers within a segment. Thus, some of the leaf nodes can be divided into a group that corresponds to a global segment, while other leaf nodes can be divided into a group that corresponds to a local segment.

The branch nodes can thus be organized according to the grouping of the leaf nodes, and assigning a branch node corresponds to assigning all of the resources in nodes appearing underneath the branch node. It may be advantageous to have two distinct channel trees, one corresponding to resources assigned to global segments and another channel tree corresponding to the resources assigned to local segments.

If the resource scheduler 234 assigns a branch node sufficiently deep in the channel tree to a particular communication link based on the channel characteristics, the channel tree can be constrained such that all of the lower nodes underneath the branch node will be assigned to the same segment. This channel tree organization can simplify the mapping of the logical nodes to the physical resources.

The resource scheduler 234 or the frequency hopping module 238 can map the logical channel tree assignments to physical sub-carrier assignments. Therefore, the logical node assignments can remain stable while the physical sub-carriers mapped to the nodes can vary.

A frequency hopping module 238 can be configured to improve interference diversity by implementing frequency hopping within the assigned segment. The frequency hopper module 238 can, for example, implement a pseudorandom frequency hopping scheme for each assigned sub-carrier. The receiver can be configured to utilize the same frequency hopping algorithm to determine which sub-carriers are assigned to its corresponding link. For example, the frequency hopping module 238 can implement a frequency hopping algorithm that results in the same logical nodes being mapped to different physical sub-carriers at different instances.

The scheduler 230 can include a CQI receiver 236 configured to receive and process channel characteristic reporting messages generated by the user terminals and transmitted on the reverse link. Such reporting messages may be used to schedule the forward link assignments in FDD systems, or systems in which the reverse pilots do not sufficiently represent the forward link resources.

The manner and information included in the reporting messages are described in further detail below in relation to the description of the receiver embodiment. For the purposes of resource assignment, it is sufficient to describe the reporting messages as including some measure of channel characteristics, channel quality, segment preference, or some other indication that can be related to a segment preference.

The CQI receiver 236 is configured to receive the reporting messages and determine, based at least in part on the reporting messages, if the present resource allocation should be sustained or if the sub-carrier or segment allocations should be modified. The CQI receiver 236 can communicate the assignment information to the resource scheduler 234 that is configured to control the signal mapper 214 to implement the sub-carrier and segment assignments. The resource scheduler 234 can also report any new sub-carrier or segment assignments to the corresponding receiver. For example, the resource scheduler 234 can be configured to generate a control message that is communicated to the appropriate receiver using an overhead channel.

Figure 3:
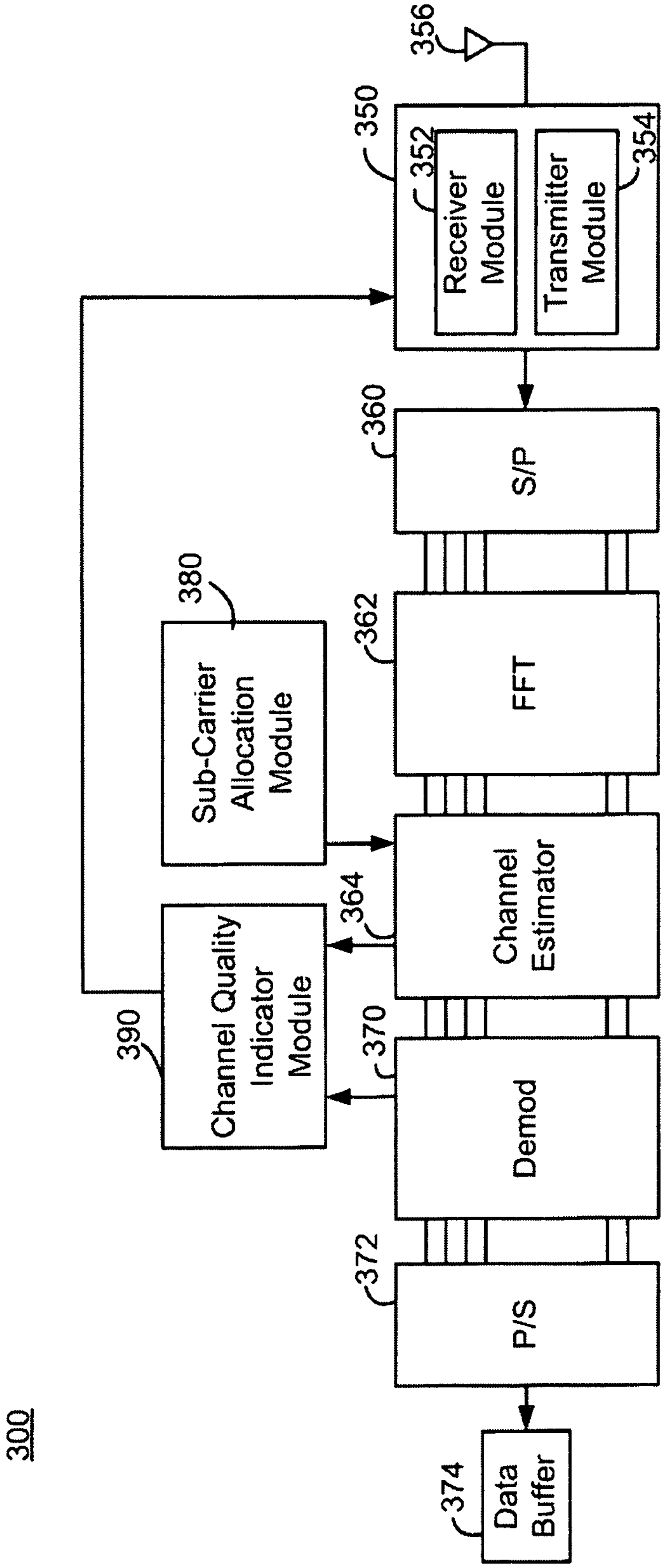
FIG. 3 is a simplified functional block diagram of an embodiment of a receiver in a system implementing segment sensitive scheduling.

FIG. 3 is a simplified functional block diagram of an embodiment of a receiver 300. The receiver 300 can be, for example, part of a user terminal 110 shown in FIG. 1. The following discussion describes a receiver 300 implemented within a user terminal of an OFDMA wireless communication system using reporting messages for the determination of the forward link assignments.

The receiver 300 can include an antenna 356 coupled to a transceiver 350 configured to communicate over a wireless channel with the transmitter 200 shown in FIG. 2. The transceiver 350 can include a forward link receiver module 352 configured to receive the forward link wireless signals, via the antenna 356, and generate a serial baseband symbol stream.

The output of the receiver module 352 of the transceiver 350 is coupled to a serial to parallel converter 360 configured to convert the serial symbol stream to a plurality of parallel streams corresponding to the number of carriers in the OFDMA system.

The output of the serial to parallel converter 360 is coupled to a Fast Fourier Transform (FFT) module 362. The FFT module 362 is configured to transform the time domain symbols to the frequency domain counterpart.

The output of the FFT module 362 is coupled to a channel estimator 364 that is configure to determine a channel and interference estimate based in part on the forward link pilot signals. A carrier allocation module 380, alternatively referred to as a resource allocation module, can determine the sub-carriers assigned to the data and the sub-carriers assigned to the forward link pilot signals. The carrier allocation module 380 can determine the sub-carrier and segment assignments based in part on any assignment messages received. The carrier allocation module 380 can, for example, implement a frequency hopping algorithm to determine the current carrier assignment based on a past assignment. The carrier allocation module 380 is coupled to the channel estimator 364 and informs the channel estimator 364 of the sub-carrier and segment assignment.

The channel estimator 364 determines a channel and interference estimate based on the forward link pilot signals. The channel estimator 364 can be configured to estimate the channel and interference for each of the segments of the OFDMA system. The channel estimator 364 can determine an estimate using a least squares method, a maximum likelihood estimate, a combination of least squares and maximum likelihood estimate, and the like, or some other process of channel and interference estimation.

The output of the channel estimator 364 including the frequency domain transform of the received symbols and the channel and interference estimates is coupled to a demodulator 370. The carrier allocation module 380 can also inform the demodulator 370 of the sub-carrier frequencies allocated to data transmission. The demodulator 370 is configured to demodulate the received data carriers based in part on the channel and interference estimate. In some instances, the demodulator 370 may be unable to demodulate the received signals. As noted earlier, the demodulator 370 may be unsuccessful because the channel quality is inadequate and cannot support the transmitted rate of the data, or because degradation attributable to inadequate channel and interference estimation is sufficiently severe to result in decoding error.

If the demodulator 370 is unsuccessful, it can generate an indication of the inability to demodulate the received signals. The demodulator 370 can also provide an unsuccessful demodulation indication to the transmitter module 354 in the transceiver 350 for transmission back to the base station.

If the demodulator 370 is unsuccessful, the received data is dropped, and there is no need to couple any data to memory. If the demodulator 370 is successful, the demodulator 370 can be configured to couple the demodulated data to a parallel to serial converter 372 that is configured to convert the parallel demodulated data to a serial data stream. The output of the parallel to serial converter 372 is coupled to a data buffer 374 for further processing.

A channel quality indicator (CQI) module 390 can also be coupled to the channel estimator 364 and can use the values of pilot power, channel estimate, and interference estimate to determine a value of the CQI for each of the segments. In one embodiment, the CQI value is based in part on the SNR. The CQI module 390 couples the CQI value to the transmitter module 354, which can be configured to transmit the value to the base station using, for example, an overhead channel, control channel, or traffic channel.

The wireless communication system can implement a channel characteristic reporting scheme that is configured to minimize the amount of reporting messages that need to be communicated to the base stations. The wireless communication system can implement channel reporting schemes that require a user terminal to provide reporting messages on a periodic basis, an assigned basis, a probabilistically determined basis, or some other basis or combination of bases.

If the wireless communication system implements a periodic reporting scheme, the period can correspond to a predetermined time. The predetermined time can be based on a symbol timing, and can be based on a frame of symbols or multiple frames of symbols.

The CQI module 390 can be configured to report the CQI or an index of the segment corresponding to the best frame, if the reporting period spans multiple frames. In other embodiments, the CQI module 390 can be configured to average the CQI values over multiple frames and report the CQI or index of the segment having the best averaged CQI. In another embodiment, the CQI module 390 can be configured to report the CQI or index of the segments exhibiting improving CQI values. The CQI module 390 is not limited to any particular reporting criteria, and may use some other criteria for determining which segment or segments to report, and the information included with the reporting message.

If the feedback channel capacity and link budget are not limited in a system, each user terminal could transmit an array of CQI reporting messages for all frequency segments. In such a brute force reporting scheme, each user terminal reports every CQI value corresponding to every segment. However, this creates an enormous amount of unnecessary information.

To improve the amount of overhead used for reporting CQI, the wireless communication system can implement a reporting scheme where user terminals measure the forward link pilots and feedback the identity of the preferred frequency segment(s). In one embodiment, the user terminals determine a predetermined number of preferred segments and can report the identity of the predetermined number of segments to the scheduler in one or more reporting messages. The predetermined number can be a fixed number or can be varied, for example, based on a control message transmitted by the scheduler or a communication bandwidth desired by the user terminal.

The user terminal can generate reporting messages that report a CQI for as few as one preferred segment or CQI values for as many as all of the segments. In some embodiments, the number of segments identified in a reporting message can depend on a bandwidth occupied or desired in the communication link to the user terminal. For example, a user terminal having a communication bandwidth that is less than a bandwidth of a segment may report as few as one segment CQI value or a segment identity. A second user terminal having a communication bandwidth that is greater than the bandwidth of a single segment may report CQI values or segment identities for at least the number of segments needed to support the communication bandwidth.

In other embodiments, the wireless communication system may define more than one local segment size, or multiple local segments can be aggregated to form a larger segment. In such an embodiment, the user terminal can report a desired preferred segment of any size, and the segment size is not limited to a single segment size. In one embodiment, the user terminal can store a codebook with multiple segment sizes. The user terminal can determine a CQI value for each cluster or segment size defined in the codebook. The user terminal can report N of the best segment sizes based upon some predefined criteria, which may be part of the communication session or negotiated on a periodic basis.

The format of the reporting messages may be predetermined such that the user terminal reports the identities of the one or more segments in order of decreasing preference. Of course, other reporting message formats may be used. For example, the user terminal may report a CQI value and corresponding segment identity for each reported segment that is identified as a preferred segment.

The scheduler can use the reporting messages and other scheduling criteria to determine the tones or sub-carriers that are assigned to each of the user terminals. The wireless communication system can thus use the reporting messages to maintain communication links between base stations and user terminals over the segments that opportunistically provide advantageous performance.

In an embodiment of a reporting scheme implementing an efficient channel preference feedback algorithm, a user terminal can generate a reporting message using $\log_2 L$ bits to indicate the segment with the best channel quality, where there are L segments in the system. The user terminal transmits only the CQI of the best segment or only a segment index corresponding to the best segment in the feedback reporting message. The user terminal does not need to report L-1 CQI values corresponding to segments with lesser CQI values.

The CQI module 390 can further reduce the feedback rate by implementing thresholding logic in best segment reporting. Given a long term average channel quality in SNR, the CQI module 390 can compare the SNR corresponding to the best segment against the average SNR and choose not to report the CQI corresponding to the best segment unless it is a predetermined value, Δ, above the average. For example, the CQI module 390 can generate the reporting message if the CQI corresponding to the best segment is Δ dB above the average.

Thus, the CQI module 390 can have the opportunity to transmit a reporting message on a periodic basis or on an assigned basis and may selectively not transmit the reporting message based on the thresholding logic. For example, the CQI module 390 may be allowed to transmit a reporting message in a predetermined time slot that occurs each reporting interval, which can be, for example 15 ms. Alternatively, the CQI module 390 can be assigned a reporting time based on a round robin allocation of reporting slots to each of the user terminals in a base station coverage area. The CQI module 390 can implement thresholding logic to further reduce the instances of reporting messages regardless of the underlying reporting timing. In other embodiments, the CQI module 390 can be configured to generate and transmit a reporting message when the thresholding logic is satisfied.

This thresholding mechanism can provide a manner for a scheduler to balance the segment sensitive scheduling gain and reverse link feedback capacity. A scheduler in the wireless communication system can broadcast or multicast the desired threshold level, Δ, to user terminals based on reverse link feedback channel loading. High thresholds would lead to less reporting and low thresholds would lead to more reporting.

Alternatively, the scheduler can broadcast or multicast a desired reporting rate directly. for example, the scheduler in the base station can transmit a desired percentage of time a user terminal is allowed to report the best segment. Each CQI module 390 in a user terminal can translate the desired reporting rate into a Δ dB threshold based on historical channel characteristic statistics maintained by the user terminal. For example, the CQI module 390 can collect the CQI values determines for each of the segments and can generate a distribution of the CQI values over time. The CQI module 390 can, for example, generate a Cumulative Distribution Function (CDF) based on the historical values. The CQI module 390 can then determine a threshold based on the desired reporting percentage and the CDF. For example, a reporting rate of 0.3 can corresponds to a 70% CDF quantile and Δ=5 dB reporting threshold. The CDF maintained by each CQI module 390 can be distinct, because they are established based on the channel characteristics experienced by the user terminal. Furthermore, the CDF may change over time, as the channel characteristics experienced by the user terminal change, for example, due to mobility or changes in the multipaths in the environment.

If HARQ is deployed in a system, the CQI module 390 can be configured to include the average CQI across all frequency segment the feedback reporting message. Although the conservative CQI will lead to the scheduling of low spectral efficiency transmission, early termination of HARQ is likely to retain a substantial fraction of the achievable capacity gain given reasonable HARQ granularity. This approach also improve the robustness of segment sensitive scheduling in the cases when the scheduled segment is not the best one and may possibly be a poor selection, because of, for example, channel decorrelation between channel measurement time and the actual transmission time, measurement mismatch, or some other factors.

Figure 4:
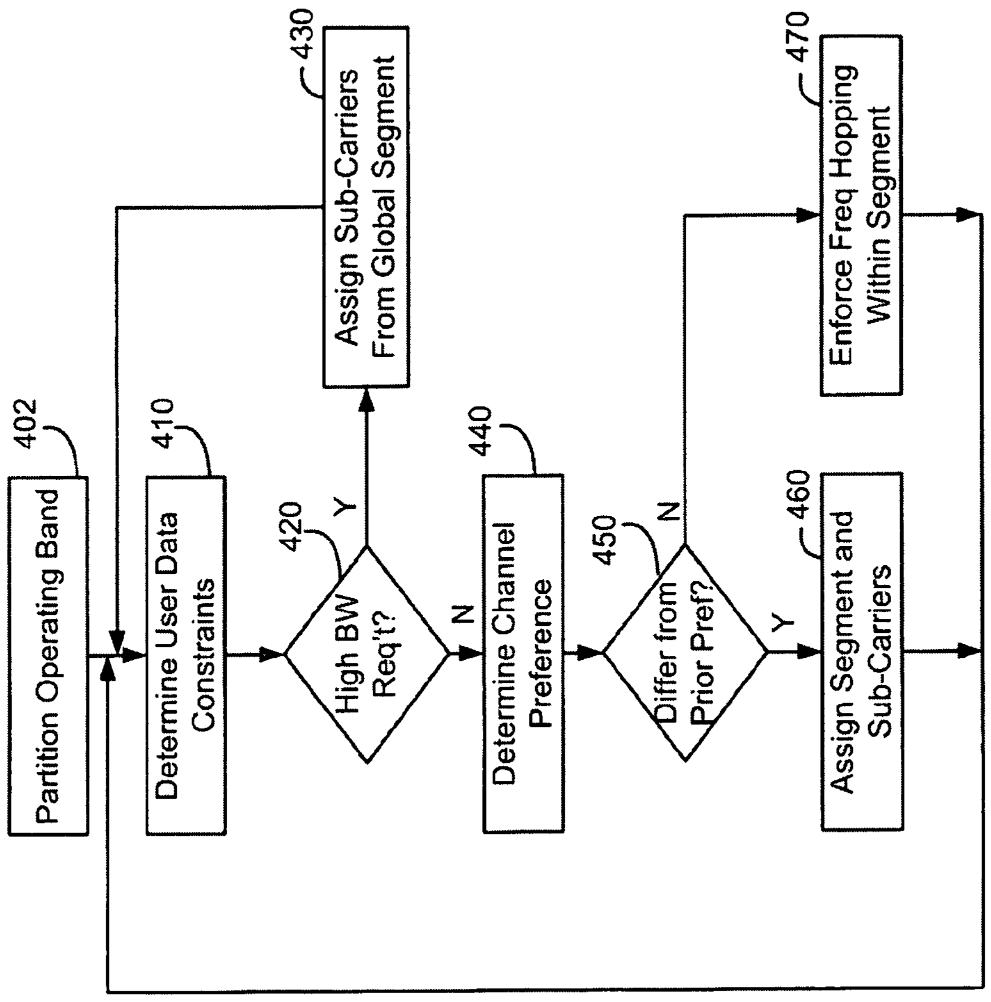
FIG. 4 is a simplified flowchart of an embodiment of a method of segment sensitive scheduling.

FIG. 4 is a simplified flowchart of an embodiment of a method 400 of segment sensitive scheduling. The method 400 can be performed, for example, by the scheduler in an OFDMA wireless communication system, such as a scheduler in a base station shown in the system of FIG. 1. For example, the scheduler shown in the base station transmitter of FIG. 2 can be configured to perform the method 400. The scheduler can perform the method 400 for each of the users. For example, the scheduler can perform the method for each of the forward link and reverse links established between a base station and user terminals in the base station coverage area.

The method 400 begins at block 402 where the scheduler partitions the operating band into a plurality of segments. The wireless communication system can define the segments, and the segments can include one or more global segments and one or more local segments. The global segments can include a subset of the sub-carriers of the OFDMA system that span substantially a large fraction of the operating band. The global segments typically are assigned non-contiguous frequency spans comprising one or more sub-carriers. The local segments can be contiguous or non-contiguous bands that include one or more sub-carriers. The local segments typically have a bandwidth that is less than a coherent bandwidth of the wireless channel. In some cases the segments may be pre-partitioned in a predetermined manner and known to both the base station and mobile station. As such, this functionality may be omitted.

The scheduler need not perform any actual physical partitioning of the operating band, but may instead, merely account for the various segments and the sub-carriers associated with each segment. The scheduler typically associates each sub-carrier with only one segment, and each segment includes a distinct subset of sub-carriers.

The scheduler proceeds to block 410 and determines user data constraints. Such user data constraints can include data latency constraints, bandwidth constraints, and other constraints that may be associated with particular users or communication links. The scheduler can be configured to attempt to satisfy substantially all data constraints when scheduling the segment.

After receiving the data constraints, the scheduler proceeds to decision block 420 to determine if the channel for a particular user requires high bandwidth. In the context of the scheduler, the term high bandwidth refers to a user that requires a resource assignment that exceeds the bandwidth of a predetermined number of local segments. The predetermined number of local segments can be, for example, one, or can be some other number greater than one. High data rate users can require transmission of signals over a large fraction of the total bandwidth, which reduces the potential gain of scheduled transmission over average channel SNR.

If the user requires high bandwidth, the scheduler proceeds to block 430 and assigns the user to a global segment and assigns sub-carriers from the assigned global segment. The scheduler then proceeds from block 430 back to block 410.

If, at decision block 420 the scheduler determines that the user does not require high bandwidth, the scheduler proceeds to block 440 and determines a segment preference for the user and communication link. The scheduler can determine a segment preference based on channel analysis, channel characteristic reporting messages; or a combination of analysis and reporting messages.

In one embodiment, the scheduler can determine a channel estimate for each local segment in the operating band based on a pilot signal transmitted by the user terminal. The scheduler can compare all of the channel estimates to determine the segment preference as the segment that has the best channel characteristics. For example, the scheduler can determine, based in part on the channel estimates, which of the segments has the highest SNR.

In another embodiment, the scheduler can receive reporting messages from some or all of the user terminals. The reporting messages can include a segment preference or can include channel characteristics that the scheduler can use to determine a segment preference.

After determining the segment preference for a particular user, the scheduler proceeds to decision block 450 to determine whether the segment preference differs from a previous segment preference for that same user.

If the scheduler determines that the segment preference has changed, the scheduler proceeds to block 460 and assigns a segment and sub-carriers from the segment to the communication link. In the forward link direction, the scheduler can assign a channel by controlling a signal mapper to map the data signal for the user terminal to the appropriate sub-carriers in the preferred segment. In the reverse link direction, the scheduler can generate a segment assignment message that identifies the segment and sub-carriers assigned to that user terminal. After segment assignment, the scheduler proceeds back to block 410.

The wireless communication system can implement sticky or persistent assignments. The user terminal can use the same assignment until it receives a de-assignment message. In one embodiment, the de-assignment message can be an assignment message to a distinct user terminal for a sub-carrier for which the user terminal is assigned.

If, at decision block 450, the scheduler determines that the segment preference has not changed, the scheduler proceeds to block 470. At block 470, the scheduler can provide some form of interference diversity by implementing frequency hopping. The scheduler can be configured to enforce frequency hopping within the assigned segment in order to maintain the advantages of segment sensitive scheduling. After enforcing the frequency hopping on the assigned sub-carriers, the scheduler proceeds back to block 410.

Figure 5:
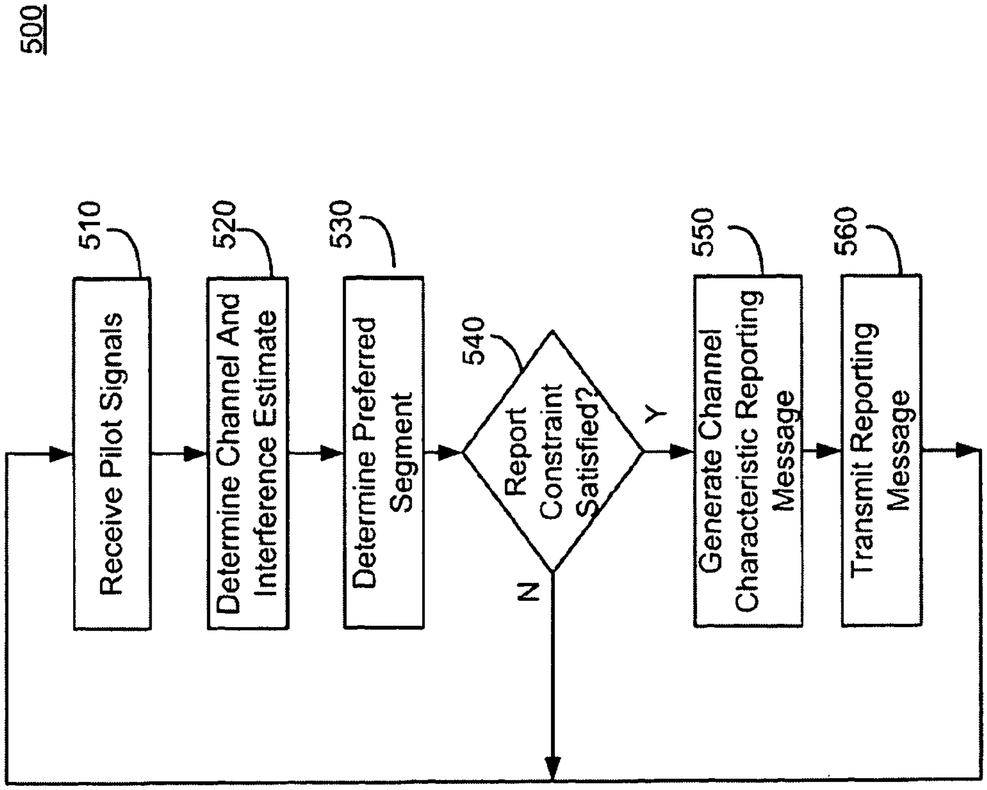
FIG. 5 is a simplified flowchart of an embodiment of a method of segment characteristic reporting in a system implementing segment sensitive scheduling.

FIG. 5 is a simplified flowchart of an embodiment of a method 500 of channel characteristic reporting in a system implementing segment sensitive scheduling. As noted above, the scheduler can utilize reporting messages as part of the segment sensitive scheduling process. The manner in which reporting messages are generated and transmitted to the scheduler can affect the amount of overhead required to support reporting messages. The reporting method 500 can be performed, for example, by a user terminal of the wireless communication system of FIG. 1 to assist in scheduling of forward link OFDMA channels.

The method 500 begins at block 510 where the user terminal receives the forward link pilot signals. The user terminal proceeds to block 520 and determines channel characteristics for each of the predetermined local segments in the operating band. The user terminal can, for example, determine the signal level, interference level, SNR over the segment, or some other channel characteristic for each local segment. The user terminal can also determine channel characteristics, such as an average channel strength or average SNR for each of the global segments.

The user terminal proceeds to block 530 and determines a preferred segment from the various segments. A high bandwidth user may prefer a global segment to any local segment merely due to the ability of the global segment to satisfy the bandwidth requirements. If there are multiple global segments, the user terminal can determine a global segment having the greatest average SNR as the preferred segment.

Alternatively, fit the user terminal is assigned to a local segment or capable of assignment to a local segment, the user terminal determines which of the segments is the preferred segment. The user terminal can, for example, select the local segment that corresponds to the highest SNR or channel power. In another embodiment, the user terminal may select the segment having the least interference. In another embodiment, the user terminal can select a preferred segment based on a variety of factors.

After determining the segment preference, the user terminal proceeds to decision block 540 to determine whether a reporting constraint is satisfied. The user terminal can include a number of reporting constraints and may generate and transmit a reporting message only when a predetermined number of constraints are satisfied. The user terminal can limit the reporting messages using the reporting constraints in order to minimize the amount of reporting overhead communicated to the scheduler.

For example, the user terminal can limit reporting to messages that report SNR values greater than a predetermined threshold above an average channel SNR. The predetermined threshold can be static or can be communicated from the scheduler. Additionally, the user terminal can be limited to only reporting segment preferences that are distinct from the segment in which the user terminal is presently operating.

If the user terminal does not satisfy the reporting constraints, the user terminal returns to block 510 and does not generate a reporting message. Alternatively, if at decision block 540 the user terminal determines that the reporting constraints have been satisfied, the user terminal proceeds to block 550 and generates a reporting message.

The user terminal can, for example, generate a reporting message that identifies the preferred segment or a plurality of preferred segments. The user terminal can, for example, report an index corresponding to the preferred segment. The user terminal may also include in the reporting message other channel characteristics, such as an average CQI over all segments.

After generating the reporting message, the user terminal proceeds to block 560 and transmits the reporting message to the scheduler. For example, the user terminal can transmit the reporting message or messages to a base station on a reverse link overhead channel. The user terminal returns to block 510 to repeat the channel analysis and reporting method 500.

Methods and apparatus for segment sensitive scheduling have been described. An OFDMA wireless communication system can implement segment sensitive scheduling to improve the performance of the communication links. The wireless system can partition the operating band into a number of segments, including global segments and local segments. A scheduler in the system can be configured to assign a segment and sub-carriers within the segment to each communication link based on channel characteristics. The channel characteristics can be determined at the scheduler using channel analysis or can be determined at the receiver and fed back to the scheduler in one or more reporting messages.

Reporting constraints can be imposed on the reporting messages to limit the overhead needed to support the reporting messages. The reporting constraints can limit the amount of information reported and can limit the instances of reporting messages. For example, the reporting messages can be limited to reporting a CQI value or segment index for a segment preference. The reporting messages can be limited to reporting on a predetermined periodic basis or an assigned basis such as in round robin reporting where each user terminal in a base station coverage area reports one time before any user terminal transmits an updated reporting message. The reporting messages can also be limited to a probabilistic basis, where reporting is limited based on a probability that the user terminal will experience a preferred segment that is substantially better than an average channel characteristic.

The wireless communication system can improve the overall system performance by utilizing segment sensitive scheduling.

The various illustrative logical blocks, modules, and circuits described in connection with the embodiments disclosed herein may be implemented or performed with a general purpose processor, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method, process, or algorithm described in connection with the embodiments disclosed herein may be embodied directly in hardware, in a software module executed by a processor, or in a combination of the two.

A software module may reside in RAM memory, flash memory, non-volatile memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. Further, the various methods may be performed in the order shown in the embodiments or may be performed using a modified order of steps. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. An apparatus for channel sensitive scheduling in a communication system including a plurality of sub-carriers spanning an operating frequency band, the apparatus comprising:

a receiver module configured to receive a reverse link pilot signal and at least one channel characteristic reporting message; and a scheduler coupled to the receiver module and configured to determine, based on the reverse link pilot signal, a channel characteristic corresponding to each of a plurality of segments spanning the operating frequency band, each of the segments having a bandwidth less than a total bandwidth, the scheduler configured to determine a reverse link resource assignment based on the channel characteristics and further configured to determine a forward link resource assignment based on the at least one channel characteristic reporting message.

2. The apparatus of claim 1, wherein the channel characteristic comprises a signal to noise ratio (SNR) value.

3. The apparatus of claim 1, wherein the channel characteristic comprises an interference value.

4. The apparatus of claim 1, further comprising a signal mapper coupled to the scheduler and configured to map data symbols to forward link sub-carriers in accordance with the forward link resource assignment.

5. The apparatus of claim 1, wherein the scheduler is configured to assign sub-carriers corresponding to a global segment comprising a non-contiguous subset of the plurality of sub-carriers that span a substantial fraction of the operating frequency band for channels requiring a bandwidth greater than the coherent channel bandwidth.

6. An apparatus for channel sensitive scheduling in a communication system including a plurality of sub-carriers spanning an operating frequency band, the apparatus comprising:

means for determining a channel preference indicative of a preferred segment from a plurality of segments substantially spanning at least a portion of the operating band based upon channel characteristics experienced by a receiver; and means for assigning a subset of sub-carriers within the preferred segment to a particular communication link associated with the channel preference.

7. The apparatus of claim 6, wherein the means for determining the channel preference comprises:

means for receiving a pilot signal;

means for determining a channel characteristic corresponding to each of the plurality of segments; and means for selecting the channel preference based on the channel characteristics.

8. The apparatus of claim 6, wherein the means for determining the channel preference comprises means for receiving a channel reporting message indicative of the channel preference.

9. A method of reporting channel characteristics in a communication system including a plurality of sub-carriers spanning an operating frequency band, the method comprising:

receiving a pilot signal;

determining a channel characteristic corresponding to each of a plurality of segments spanning the operating band, each segment having a bandwidth less than a coherent channel bandwidth;

determining a preferred segment from the plurality of segments;

comparing the channel characteristic corresponding to the preferred segment to a reporting threshold; and generating a reporting message based on the preferred segment if the channel characteristic corresponding to the preferred segment exceeds the reporting threshold.

10. The method of claim 9, further comprising transmitting the reporting message to a scheduler.

11. The method of claim 9, wherein the pilot signal comprises a forward link pilot signal.

12. The method of claim 9, wherein the channel characteristic comprises a signal to noise ratio (SNR).

13. The method of claim 9, wherein the channel characteristic comprises an interference value.

14. The method of claim 9, wherein the channel characteristic comprises a pilot signal strength.

15. The method of claim 9, wherein determining the preferred segment comprises selecting a segment corresponding to a largest signal to noise ratio.

16. The method of claim 9, wherein determining the preferred segment comprises selecting a segment corresponding to a least interference value.

17. The method of claim 9, wherein comparing the channel characteristic corresponding to the preferred segment to the reporting threshold comprises determining whether a signal to noise ratio corresponding to the preferred segment exceeds an average SNR ratio by a predetermined amount.

18. The method of claim 9, wherein comparing the channel characteristic corresponding to the preferred segment to the reporting threshold comprises:

receiving a differential value from a scheduler; and determining whether a signal to noise ratio corresponding to the preferred segment exceeds an average SNR ratio by the differential value.

19. A non-transitory computer-readable storage medium storing instructions that when executed by a processor cause the processor to perform instructions for reporting channel characteristics in a communication system including a plurality of sub-carriers spanning an operating frequency band, the instructions comprising:

receiving a pilot signal;

determining a channel characteristic corresponding to each of a plurality of segments spanning the operating band, each segment having a bandwidth less than a coherent channel bandwidth;

determining a preferred segment from the plurality of segments;

comparing the channel characteristic corresponding to the preferred segment to a reporting threshold; and generating a reporting message based on the preferred segment if the channel characteristic corresponding to the preferred segment exceeds the reporting threshold.

20. The non-transitory computer-readable storage medium of claim 19, the instructions further comprising transmitting the reporting message to a scheduler.

21. The non-transitory computer-readable storage medium of claim 19, wherein the pilot signal comprises a forward link pilot signal.

22. The non-transitory computer-readable storage medium of claim 19, wherein the channel characteristic comprises a signal to noise ratio (SNR).

23. The non-transitory computer-readable storage medium of claim 19, wherein the channel characteristic comprises an interference value.

24. The non-transitory computer-readable storage medium of claim 19, wherein the channel characteristic comprises a pilot signal strength.

25. The non-transitory computer-readable storage medium of claim 19, wherein determining the preferred segment comprises selecting a segment corresponding to a largest signal to noise ratio.

26. The non-transitory computer-readable storage medium of claim 19, wherein determining the preferred segment comprises selecting a segment corresponding to a least interference value.

27. The non-transitory computer-readable storage medium of claim 19, wherein comparing the channel characteristic corresponding to the preferred segment to the reporting threshold comprises determining whether a signal to noise ratio corresponding to the preferred segment exceeds an average SNR ratio by a predetermined amount.

28. The non-transitory computer-readable storage medium of claim 19, wherein comparing the channel characteristic corresponding to the preferred segment to the reporting threshold comprises:

receiving a differential value from a scheduler; and determining whether a signal to noise ratio corresponding to the preferred segment exceeds an average SNR ratio by the differential value.

* * * * *